United States Patent
Bercovici et al.

(10) Patent No.: US 12,151,408 B2
(45) Date of Patent: Nov. 26, 2024

(54) SYSTEMS AND METHODS FOR MANUFACTURING ARTICLES IN SPACE

(71) Applicant: TECHNION RESEARCH & DEVELOPMENT FOUNDATION LIMITED, Haifa (IL)

(72) Inventors: Moran Bercovici, Haifa (IL); Valeri Frumkin, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 149 days.

(21) Appl. No.: 17/324,703

(22) Filed: May 19, 2021

(65) Prior Publication Data

US 2021/0362445 A1    Nov. 25, 2021

(30) Foreign Application Priority Data

May 19, 2020   (IL) .......................................... 274781

(51) Int. Cl.
*B29C 39/02* (2006.01)
*B29D 11/00* (2006.01)

(52) U.S. Cl.
CPC ...... *B29C 39/026* (2013.01); *B29D 11/00538* (2013.01); *B29D 11/00557* (2013.01); *B29D 11/00596* (2013.01)

(58) Field of Classification Search
CPC ........ B29D 11/00596; B29D 11/00538; B29D 11/00557; B29C 39/026
See application file for complete search history.

(56) References Cited

U.S. PATENT DOCUMENTS 3,251,908 A * 5/1966 Wilenius ................. B29C 39/26
425/173

FOREIGN PATENT DOCUMENTS

WO   WO 2019/141990   * 7/2019
WO   WO 2019/246418   * 12/2019

OTHER PUBLICATIONS

Frumkin, V. & Bercovici, M. Fluidic Shaping of Optical Components. ArXiv200509898 Phys. (2020).at <http://arxiv.org/abs/2005.09898>.
Boyko, E., Eshel, R., Gommed, K., Gat, A.D. & Bercovici, M. Elastohydrodynamics of a pre-stretched finite elastic sheet lubricated by a thin viscous film with application to microfluidic soft actuators. J. Fluid Mech. 862, 732-752 (2019).
Boyko E, Eshel R, Gat AD, Bercovici M. Nonuniform Electroosmotic Flow Drives Fluid-Structure Instability. Phys Rev Lett. Jan. 17, 2020;124(2):024501. doi: 10.1103/PhysRevLett.124.024501. PMID: 32004032.

(Continued)

Primary Examiner — Mathieu D Vargot
(74) Attorney, Agent, or Firm — The Roy Gross Law Firm, LLC; Roy Gross

(57) ABSTRACT

A fluidic optical device comprising a housing comprising a wall defining a lumen, wherein the wall is in fluid communication with a reservoir comprising a liquid, and a control unit for forming a fluidic lens bounded by the wall, under microgravity conditions. Further, a method for fabricating the fluidic optical device of the invention, and a system comprising the fluidic optical device, are provided.

17 Claims, 11 Drawing Sheets
(11 of 11 Drawing Sheet(s) Filed in Color)

(56) References Cited

OTHER PUBLICATIONS

Boyko, E., Ilssar, D., Bercovici, M. & Gat, A.D. Interfacial instability of thin films in soft microfluidic configurations actuated by electro-osmotic flow. Phys. Rev. Fluids 5, 104201 (2020).

Paratore F, Bacheva V, Kaigala GV, Bercovici M. Dynamic microscale flow patterning using electrical modulation of zeta potential. Proc Natl Acad Sci U S A. May 21, 2019;116(21):10258-10263. doi: 10.1073/pnas.1821269116. Epub May 6, 2019. PMID: 31061121; PMCID: PMC6534970.

Paratore F, Boyko E, Kaigala GV, Bercovici M. Electroosmotic Flow Dipole: Experimental Observation and Flow Field Patterning. Phys Rev Lett. Jun. 7, 2019;122(22):224502. doi: 10.1103/PhysRevLett. 122.224502. PMID: 31283260.

Frumkin, V., Gommed, K. & Bercovici, M. Dipolar thermocapillary motor and swimmer. Phys. Rev. Fluids 4, 074002 (2019).

Elgarisi, M., Frumkin, V., Luria, O. & Bercovici, M. Fluidic Shaping of Freeform Optical Components. ArXiv210302765 Phys. (2021).at <http://arxiv.org/abs/2103.02765>.

Kotz, F., Quick, A. S., Risch, P., Martin, T., Hoose, T., Thiel, M., Helmer, D., Rapp, B. E., Two-Photon Polymerization of Nanocomposites for the Fabrication of Transparent Fused Silica Glass Microstructures. Adv. Mater. 2021, 33, 2006341. https://doi.org/10.1002/adma.202006341.

Gissibl, T., Thiele, S., Herkommer, A. et al. Two-photon direct laser writing of ultracompact multi-lens objectives. Nature Photon 10, 554-560 (2016). https://doi.org/10.1038/nphoton.2016.121.

\* cited by examiner

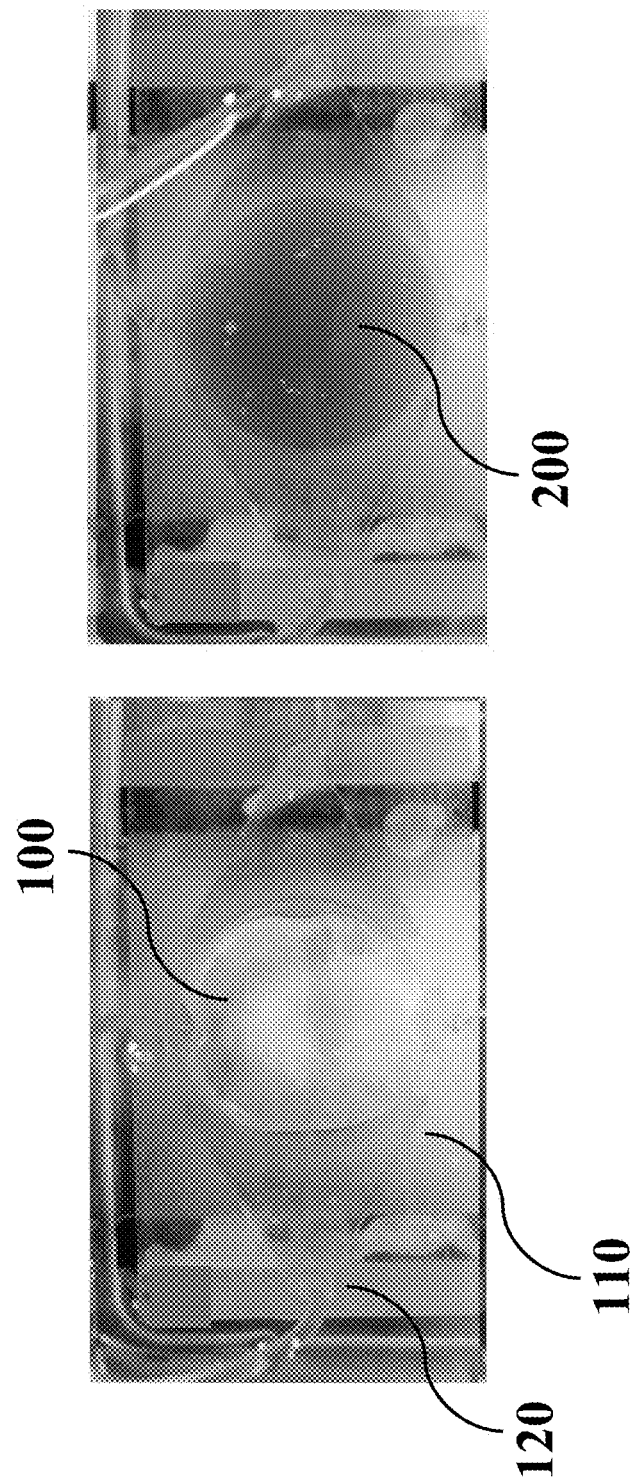

SYSTEMS AND METHODS FOR MANUFACTURING ARTICLES IN SPACE

CROSS REFERENCE TO RELATED APPLICATIONS

This application claims the benefit of priority of Israel Patent Application No. 274781, filed on May 19, 2020. The contents of the above are all incorporated by reference as if fully set forth herein in their entirety.

FIELD OF THE INVENTION

The invention relates generally to the field of devices for manufacturing articles under neutral buoyancy conditions.

BACKGROUND OF THE INVENTION

Several concepts in which fluid is used as the main component in an optical configuration have been proposed over the years. Most notable is the liquid mirror telescope concept which dates to the mid-19th century, wherein a reflecting liquid (often mercury) is spun around a fixed axis to produce a parabolic shape. The main disadvantage of such telescopes is that they rely on continuous spinning of the liquid and this is likely what prevented them from becoming a mainstream technology.

Another recurring concept for fluidic-based adaptive optics is based on injecting a liquid into the gap between two parallel elastic membranes which deform according to the volume injected. This configuration has the advantage of enabling dynamic modification of the lens' curvature and thus the lens' focal length. However, the configuration does not provide significant, if any, benefit in terms of the size of the device to be launched, since it relies on a pre-constructed rigid frame in which the membranes are embedded. Furthermore, the quality of the lens surface depends on the membrane, which for large deformations exhibits wrinkles and may suffer from fatigue over large number of actuation cycles.

The foregoing examples of the related art and limitations related therewith are intended to be illustrative and not exclusive. Other limitations of the related art will become apparent to those of skill in the art upon a reading of the specification.

SUMMARY OF THE INVENTION

The following embodiments and aspects thereof are described and illustrated in conjunction with systems, tools and methods which are meant to be exemplary and illustrative, not limiting in scope.

In one aspect of the invention, there is provided a device for fabricating an article with a pre-defined shape comprising a housing comprising a wall defining a lumen; a reservoir comprising a liquid and being in fluid communication with a port in contact with or in close proximity to the wall; an actuator in operable communication with the reservoir and configured to induce flow of the liquid towards the port; a control unit configured to control the actuator to induce flow of the liquid so as to substantiality fill the lumen under microgravity conditions.

In one embodiment, the article is a fluidic article having a pre-defined curvature, wherein the fluidic article is selected from a fluidic lens and a fluidic mirror.

In one embodiment, the optical surface of the fluidic lens is defined by a surface of the liquid volume.

In one embodiment, the control unit is configured to determine the pre-defined curvature, of the article based on at least one of: (i) a surface tension of the liquid, (ii) a dimension of the wall, and (iii) acceleration force exerted on the device.

In one embodiment, the control unit is configured to: (i) receive a pre-defined curvature of the article; and (ii) control the actuator to induce flow of the liquid according to the received pre-defined curvature.

In one embodiment, the wall is an adjustable wall, optionally wherein the adjustable wall comprises a contracted configuration and an expanded configuration.

In one embodiment, the control unit is configured to: (i) receive a pre-defined curvature of the article; and (ii) further configured to control a dimension of the adjustable wall, and optionally an acceleration force exerted on the device according to the received pre-defined curvature.

In one embodiment, the adjustable wall comprises a substrate selected from the group consisting of an elastic polymeric substrate, an elastic fibrous substrate, and a shape memory substrate or any combination thereof.

In one embodiment, the liquid is characterized by surface tension and viscosity sufficient for formation of the article under space conditions, optionally wherein the liquid comprises a curable liquid.

In one embodiment, the optical property of the fluidic lens is variable by controlling any of (i) the volume of the liquid, (ii) the configuration of the wall, and (iii) the acceleration force exerted on the fluidic optical device.

In one embodiment, the optical property comprises focal length, point spread function, and wave front scattering or any combination thereof.

In another aspect, there is provided a system comprising a container and one or more devices of the invention disposed within the container.

In one embodiment, the container is adapted for isolating the one or more devices from an ambient.

In one embodiment, the one or more devices are positioned along an optical axis of the system, and optionally wherein the system is in a form of a telescope.

In another aspect, there is provided a method of controlling the device of the invention, comprising determining, by the control unit, a volume of liquid sufficient for filling the lumen with the liquid; controlling the actuator by the control unit to induce flow of the volume of the liquid towards the port, so as to obtain the article.

In one embodiment, the device comprises the adjustable wall in a condensed configuration, and the method further comprises at least partially expanding the adjustable wall, and wherein the at least partially expanding and the inducing the flow are performed simultaneously or subsequently.

In one embodiment, the predetermined volume is sufficient for (i) filling the lumen with the liquid and (ii) for forming the article according to a predetermined curvature.

In one embodiment, controlling comprises (i) receiving a pre-defined curvature, and (ii) calculating the predetermined volume of the liquid based on: a surface tension of the liquid, a dimension or shape of the wall and optionally on acceleration force exerted on the device.

In one embodiment, the method further comprises controlling a curvature of the article by modifying at least one of: a) a volume of the liquid, b) a dimension or a geometrical shape of the wall and c) acceleration force exerted on the device.

In one embodiment, the method further comprises hardening the liquid, thereby obtaining a cured article, optionally wherein hardening comprises curing.

In addition to the exemplary aspects and embodiments described above, further aspects and embodiments will become apparent by study of the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments are illustrated in referenced figures. Dimensions of components and features shown in the figures are generally chosen for convenience and clarity of presentation and are not necessarily shown to scale. The figures are listed below.

FIGS. 2A-2B are images presenting a schematic top view depicting a specific non-limiting exemplary configuration of a device of the invention, allowing fabrication of the disclosed article, such as fluidic lens. FIG. 2A represents an exemplary device comprising an empty lumen (100), and FIG. 2B represents an exemplary device comprising a lumen filled with liquid, resulting in a fluidic lens (200). The device comprises a wall (110) defining a lumen (100). The wall 110 is in fluid communication with a reservoir containing a liquid via a port (120).

FIG. 7A represents an inflatable tube that can be expanded to a circular shape from a folded state by injection of compressed air (air inlet is depicted by arrow). FIG. 7B represents a shape-memory alloy frame can be expanded to its thermally-set shape by electrical heating.

FIGS. 7C-E represent a Hoberman frame, which is an articulated structure that maintains an inner circular shape as it expands.

DETAILED DESCRIPTION OF THE INVENTION

Figure 1A:
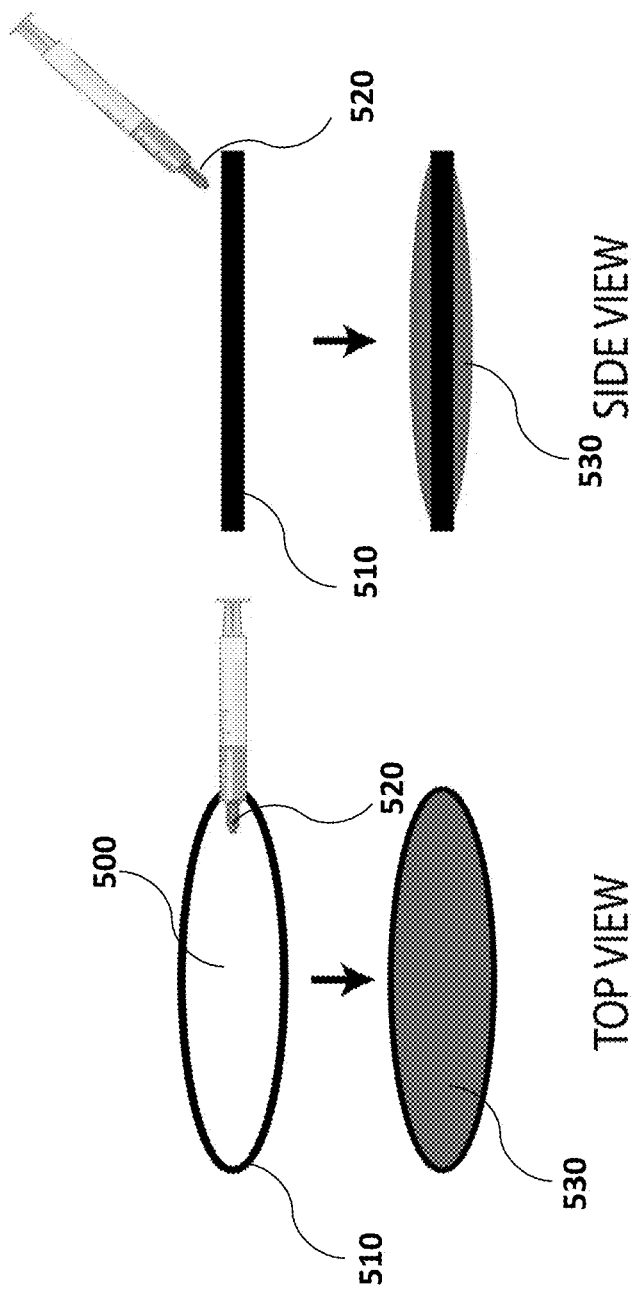
FIG. 1A presents a schematic top view and a schematic side view depicting a non-limiting exemplary configuration of the disclosed device having a wall (510) defining a lumen (500). A port (520) is in operable configuration with the wall (510) and in fluid communication with a reservoir containing a liquid. Upon providing the liquid from the reservoir in contact with the wall (510) via the port (520), a fluidic article is formed.

The invention provides, in some embodiments, a device for fabricating an article with a pre-defined shape. In some embodiments, the device comprises (i) a housing comprising a wall defining a lumen, (ii) a liquid reservoir having a port in contact with or in close proximity to the wall, and (iii) a control unit for controlling the flow of the liquid to the lumen, so as to form an article having a pre-determined shape and/or dynamic curvature bounded by the wall. Further, the invention, in some embodiments thereof, provides a system comprising the device and a method for fabricating the article of the invention, under microgravity conditions.

The current invention, in some embodiments thereof, is at least partially based on fluidic shaping, by which fluidic and/or hardened or cured articles (e.g. optical lenses) may be fabricated in space. In some embodiments, the method disclosed herein utilizes the physico-chemical properties of liquids (e.g. surface tension, viscosity, etc.) to achieve almost atomically smooth article surfaces, and enables dynamic control of their shape (e.g. curvature). The method in some embodiments thereof, also allows for selection of the lens transmission or absorbance spectrum through the selection of the lens liquid. Advantageously, the method in some embodiments thereof, does not require spinning of the liquid. Further, the device of the invention in some embodiments thereof, does not require a support or packaging for holding the liquid, and can be folded for launch to space without compromising optical quality, and after deployment the device may achieve a stationary steady state, such as without requiring any additional energy.

According to one aspect, there is provided a device for fabricating an article with a pre-defined shape comprising: a housing comprising a wall defining a lumen; a reservoir comprising a liquid and being in fluid communication with a port in contact with or in close proximity to the wall; an actuator in operable communication with the reservoir and configured to induce a flow of the liquid from the reservoir towards the port; and a control unit in operable communication with the actuator, wherein the control unit is configured to control the actuator, and to induce flow of the liquid so as to substantiality fill the lumen under microgravity conditions. In some embodiments, the control unit is configured to control the actuator, so as to initiate and/or to control or modify flow of the liquid thereby obtaining the article of the invention. In some embodiments, the article of the invention is characterized by a pre-defined shape and/or curvature.

Device

In some embodiments, the device of the invention comprises at least one wall defining a lumen. In some embodiments, the device of the invention comprises a housing comprising the wall. In some embodiments, the wall is located within the housing. In some embodiments, a portion of the housing defines the wall. In some embodiments, the wall comprises an inner portion facing the lumen and an outer portion facing the ambient.

In some embodiments, at least a part of the wall has a geometry selected from spherical, round, elliptical, conical or a combination thereof. In some embodiments, at least a part of the wall has a circular geometry or shape. In some embodiments, at least a part of the wall has an elliptical geometry or shape. In some embodiments, at least a part of the wall has spherical geometry or shape. In some embodiments, the wall is irregular in shape, that is, it does not assume a clearly identifiable geometric configuration such as circular, square, or elliptical. In some embodiments, the wall defines a compartment comprising a longitudinal axis and optionally a transverse axis.

In some embodiments, the wall is rigid. In some embodiments, the wall is substantially stable (e.g. retains its geometrical shape, dimension, and/or configuration) under operable conditions. In some embodiments, the wall is configured for binding the liquid. In some embodiments, the wall is configured for binding the liquid, wherein the liquid is in a form of a liquid volume. In some embodiments, the wall is in contact with or bound to the liquid volume, upon forming the article of the invention (e.g., fluidic lens). In one embodiment, the wall is configured to provide boundary to the liquid volume. In some embodiments, the wall is shaped to design the article with a pre-defined shape. In some embodiments, the wall is configured for binding or enclosing the hardened or cured liquid. In some embodiments, the wall is configured to be detachable from the article of the invention comprising or defined by the hardened or cured liquid.

In some embodiments, the wall of the invention is an adjustable wall, configured to modify at least one dimension and/or geometrical shape thereof. In some embodiments, the adjustable wall is configured to adopt a contracted configuration and/or an expanded configuration.

In some embodiments, the wall is in a form of a frame. In some embodiments, the wall of the invention defines a frame. In some embodiments, the frame defines a lumen. In one embodiment, the frame is configured to enclose a liquid volume. In one embodiment, the housing comprises a frame, wherein the frame comprises the wall defining the lumen. In one embodiment, the device of the invention comprises an adjustable frame defined by the adjustable wall. In one embodiment, the adjustable frame at an expanded state defines a lumen.

In one embodiment, the wall comprises an outer portion and an inner portion. In one embodiment, at an expanded state the inner portion of the wall faces the lumen. In some embodiments, the inner portion of the wall is configured for binding the liquid. In some embodiments, the inner portion of the wall has an affinity to the liquid of the invention, sufficient for binding thereof. In some embodiments, the wall (e.g. the inner portion of the wall) is configured for stably binding or enclosing the liquid volume, so that at least 70%, at least 80%, at least 90%, at least 95%, at least 97% of the liquid volume, including any range between, remains bound or enclosed by the wall under operable conditions, as described herein. In some embodiments, the inner portion of the wall comprises an opening (e.g. a hole or a slot). In some embodiments, the opening is located on top of the wall. In some embodiments, the opening is located on top of the inner portion of the wall. In some embodiments, the opening is or comprises the port of the invention. In some embodiments, the housing and/or the wall of the invention is sufficiently stable for use in space.

In some embodiments, the article of the invention is a fluid article in contact with or bound to the wall. In one embodiment, the wall in contact with the liquid volume forms an optical article, or an optical device such as an optical lens or a fluidic lens. In some embodiments, at least a part of the perimeter of the wall is in contact with or bound to the liquid volume, so as to maintain the pre-defined shape of the fabricated article. In some embodiments, the perimeter of the wall is substantially (e.g. at least 70%, at least 80%, at least 90%, at least 95%, at least 97% of the perimeter, including any range between) in contact with or bound to the liquid volume. In some embodiments, the liquid volume substantially fills the lumen defined by the wall. In some embodiments, at least a part of the cross-sectional area of the wall (e.g. at least 70%, at least 80%, at least 90%, at least 95%, at least 97%, at least 99% of the cross-sectional area, including any range between) is filled with the liquid.

In one aspect, the device of the invention comprises a port in contact with or in close proximity to the wall. In some embodiments, the port is adapted for being in fluid communication with a reservoir comprising the liquid. In some embodiments, the port is adapted for being in fluid communication with the reservoir via a fluidic channel. In some embodiments, the port is in operable communication with the wall. In some embodiments, the port is located on or within the wall. In some embodiments, the port is located on or within the inner portion of the wall. In some embodiments, the port is in a form of a dispensing mechanism. In some embodiments, the port is in a form of valve. In some embodiments, the port is in a form of an injection valve. In some embodiments, the port further comprises a backflow preventer, configured to prevent a backflow of the liquid towards the reservoir.

In one aspect, the port of the invention is configured for providing or injecting a liquid into the lumen in close proximity to the wall of the invention. In some embodiments, the port has a variable location. In some embodiments, the location is adjusted so as to provide the port in close proximity to the wall. In some embodiments, the location of the port is adjustable, so as to enable transferring or injecting a liquid into the lumen. In some embodiments, the location of the port is adjustable, so as to enable formation of the fluidic article of the invention under operable conditions (such as under neutral buoyancy or microgravity conditions).

In some embodiments, the device of the invention comprises a plurality of ports. In some embodiments, the plurality of ports are distributed or allocated across the wall so as to enable simultaneous injection of the liquid across the wall of the invention under microgravity conditions. In some embodiments, the plurality of ports is located on or within the wall of the invention (e.g. on or within the inner portion of the wall). In some embodiments, the plurality of ports enables simultaneous injection of the liquid in a plurality of locations on top or across the wall (e.g. inner portion of the wall). In some embodiments, the plurality of ports are positioned so as to enable equal distribution of the liquid across the lumen under microgravity conditions. In some embodiments, the plurality of ports are located so as to enable simultaneous injection of the liquid in a plurality of locations on top or in close proximity to the wall, thereby forming the fluidic article under operable conditions (including inter alia microgravity conditions).

In some embodiments, the device of the invention comprises an actuator. In some embodiments, the actuator is in operable communication with the reservoir comprising the liquid. In some embodiments, the actuator is configured to provide the applied load (or "actuation force" or "motive force") to the compressible portion of the container. The resulting compression of the reservoir may result in a change in fluid pressure within the reservoir so as to induce flow of the liquid from the reservoir towards the lumen.

Various actuators may be used as the actuator. In some embodiments, the actuator is a pump. In some embodiments, the actuator is selected from electrostatic actuators; voice coils; solenoids; piezoelectric; piezoceramic; electrode piezoceramic ring actuators; shape memory; shape memory alloy; dielectric electroactive polymer; dielectric polymer; electroactive polymer; multi-layer (or stacked layers of) dielectric or electroactive polymer; conductive electro-active polymer; shape memory alloy (SMA) actuators; electroactive polymer artificial muscle (EPAM) actuators; resonant motors; resonant piezoelectric motors; ultrasonic motors; ultrasonic piezoelectric motors; elliptical path motors; processing motors; stepper motors; stepper motors combined with a mechanism for conversion of rotary into linear motion (i.e., such as a lead screw arrangement); other types of motor actuators; other types of piezoelectric actuators (such as flex tensional, recurve; pre-stressed; multilayer; bimorph; piezoelectric disk benders; piezoelectric ring benders; piezoelectric tube; piezoelectric sphere or spherical sector; piezoelectric c-block; piezoelectric multilayer stack; piezoelectric rings, etc.). A polymer actuator made of an EAP, which is very thin and has low power consumption, may be used as the actuator. The EAP is a material that becomes strained when a voltage is applied thereto, similar to piezoelectric material. The EAP differs from the piezoelectric material in that strain size of the EAP is considerably greater than that of the piezoelectric material. The EAP can be categorized into an EAP actuated by an electric field, an EAP actuated by static electricity, and an EAP actuated by ions.

In some embodiments, the reservoir comprises a plurality of reservoirs in fluid communication with the wall. In some embodiments, at least a part of the plurality of reservoirs is filled with the liquid. In some embodiments, the liquid comprises a plurality of polymers. In some embodiments, each of the plurality of reservoirs is filled with a different liquid. In some embodiments, the control unit in operable communication with an actuator, wherein the control unit is configured to control the volume and/or the flow rate of any of the plurality of polymers via the actuator. In some embodiments, the control unit is configured to provide a signal for injecting a specific polymer into the wall. In some embodiments, the control unit is configured to control the chemical composition of the liquid of the fluidic lens. In some embodiments, each of the plurality of reservoirs is in operable communication with an actuator. In some embodiments, each of the plurality of reservoirs is controlled independently by the control unit so as to establish a flow of a predetermined liquid into the wall.

Reference is now made to FIG. 1A demonstrating a non-limiting configuration of an exemplary device.

The device of the invention may have a housing comprising a wall 510 (e.g. in a form of a frame) defining a lumen 500. The device may have a port 520 in operable communication with the wall 510. The port 520 may be in a form of an injector or a syringe. The port 520 may be located on or within the inner portion of the wall. The port 520 may be in fluid communication with a reservoir (e.g. via a channel). The port 520 may be configured for transferring or injecting a liquid into the lumen 500 in close proximity to the wall 510. Optionally, the liquid may be transferred by an actuator from the reservoir via the port 520 towards the lumen 500 via a channel (e.g. a liquid channel).

In some embodiments, the volume of the liquid is sufficient to fill the lumen 500 with the liquid, under operable conditions (e.g. under microgravity conditions), optionally forming a fluidic article (e.g., lens) 530 having a pre-defined shape. The fluid may be bounded by the wall under operable conditions, including inter alia microgravity conditions (or neutral buoyancy conditions).

In one aspect, the port of the invention is positioned on or within the wall of the invention. In some embodiments, the wall is in contact with the port, wherein the port is in a form of an opening facing the lumen. In some embodiments, the opening is located on or within the inner portion of the wall. In some embodiments, the opening is in fluid communication with the lumen and with the reservoir. In some embodiments, the opening is in fluid communication with the reservoir via a channel (e.g. a liquid channel). In some embodiments, the opening is configured to provide the liquid into the lumen. In some embodiments, the opening is configured to provide the liquid in contact with the inner portion of the wall. In some embodiments, the opening is configured to inject the liquid into the lumen.

Figure 1B:
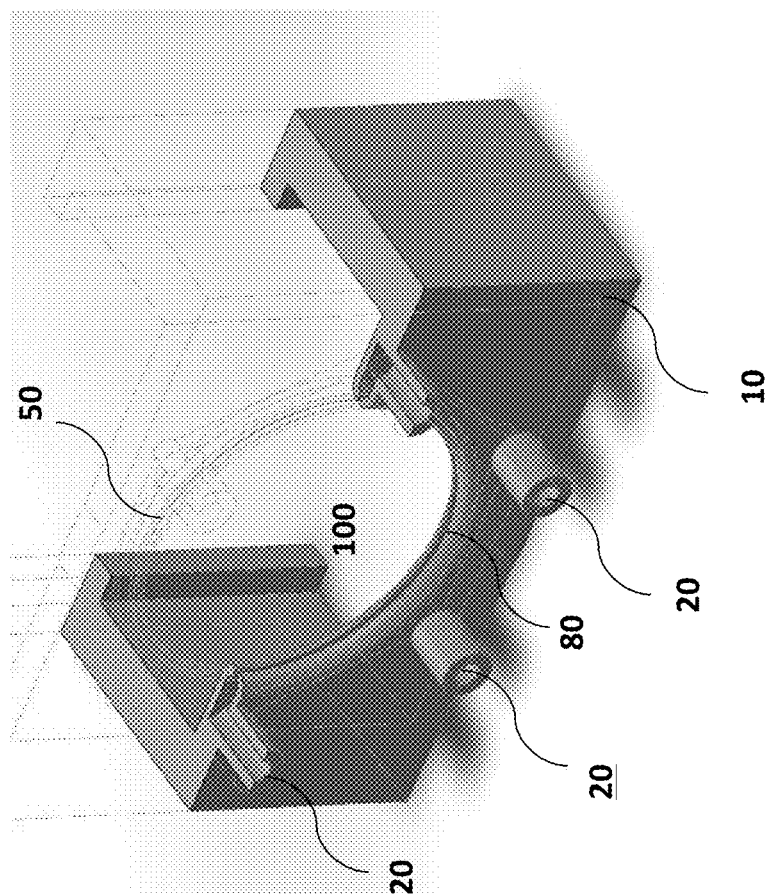
FIG. 1B presents a non-limiting exemplary configuration of the disclosed device. A housing (10) comprises a frame formed by a wall (50) defining a lumen (100). The Multiple fluidic ports (20) positioned in fluid communication to the wall (50) and are in fluid communication with the lumen (100) through slot (80).

Reference is now made to FIG. 1B demonstrating a non-limiting configuration of an exemplary device 1.

Device 1 may have a housing 10. Housing 10 may comprise a wall 50. The wall 50 may form a frame, e.g., a circular frame. Wall 50 defines the geometrical shape of the lumen 100. In some embodiments, wall 50 defines a radial component of the geometrical shape of the lumen 100.

Optionally, lumen 100 is in fluid communication with a reservoir containing liquid via one or more ports 20. The one or more ports 20 may be in an open state facilitating liquid flow, or in a closed state preventing the liquid flow. The one or more ports 20 may be in contact with or located in close proximity to the wall 50.

The wall 50 (e.g. an inner portion of the wall) may have an opening 80 facing the lumen 100. Opening 80 may be in a form of a slot. The reservoir may be in fluid communication with the lumen 100 via the opening 80. The one or more ports 20 may be in fluid communication with the opening 80 (e.g. via a channel). The one or more ports 20 may be configured to regulate liquid flow towards and into the opening 80. The one or more ports 20 in at least partially open state, may facilitate liquid flow towards and into the opening 80.

Device 1 may have an actuator configured to initiating or controlling a flow of the liquid towards the one or more ports 20. Optionally, the actuator is configured to facilitate a bi-directional flow of the liquid (e.g. from the reservoir towards the one or more ports 20 and/or from the one or more ports 20 towards the reservoir). Optionally, the actuator is in operable communication with the control unit and with the reservoir. Optionally, the actuator is in a fluid communication with the reservoir. Optionally, the actuator is configured to transfer the liquid towards the one or more ports 20. Optionally, the actuator is configured to transfer the liquid towards the one or more ports 20 towards the lumen 100. Optionally, the actuator is configured to transfer the liquid form the one or more ports 20 towards the reservoir. Optionally, the actuator is configured to transfer the liquid form the lumen 100 via the one or more ports 20 towards the reservoir.

Optionally, the control unit is configured to control the actuator so as to induce flow of the liquid. Optionally, the liquid may be transferred by an actuator from the reservoir via the port 20 towards the lumen 100 via a channel (e.g. a liquid channel). In some embodiments, the volume of the liquid is sufficient to fill the lumen 100 with the liquid, under microgravity conditions. At least a portion of the perimeter of the lumen 100 (e.g. at least 70%, at least 80%, at least 90%, at least 95%, at least 97% of the perimeter, including any range between) may be in contact with the fluid. The fluid may be bounded by or enclosed within the wall under microgravity conditions. The fluid may be stably bounded by or enclosed within the wall under operable conditions (such as under microgravity conditions), wherein stably bound is as described hereinabove.

The device of the invention further comprises a control unit in operable communication with the actuator. Optionally, the control unit is further configured to control the flow and/or volume of the liquid via the actuator. Optionally, the control unit is configured to control the flow and/or volume of the liquid transferred from the reservoir via the port 20 and/or via the opening 80 by the actuator. Optionally, the control unit is configured to control the flow and/or volume of the liquid transferred towards and to substantially fill the lumen 100. Optionally, the control unit is configured to control the flow and/or volume of the liquid required to substantially fill the lumen 100 so as to form an article of the invention with a predetermined geometrical shape and/or curvature (e.g. a fluidic lens), under operable conditions (such as under microgravity conditions). The control unit may be configured to calculate a volume of the liquid sufficient to form the article of the invention (e.g. a fluidic article) with a predetermined curvature and/or predetermined shape based on (i) a dimension (e.g. a cross-section) of the lumen 100, (ii) a surface tension and/or viscosity of the liquid, and optionally based on (iii) acceleration force exerted on the device 1.

Reference is now made to FIGS. 2A-B demonstrating a top view of a non-limiting configuration of an exemplary device of the invention configured for fabrication of fluidic articles (such as fluidic lenses).

The non-limiting exemplary device may have a frame or wall 110 defining a lumen 100. The wall 110 may be in fluid communication with a reservoir containing the liquid via a port 120. The lumen 100 may be substantially filled with the liquid, thereby forming a fluidic article (e.g. a fluidic lens) 200. The wall 110 may be configured to substantially (e.g. about 90%, about 99%, about 99.9%) enclose the lumen 100 filled with the fluid volume.

The non-limiting exemplary device as represented by FIGS. 2A-B may be utilized for testing of an exemplary device or article of the invention under conditions present on Earth, e.g. by providing the fluidic article under neutral buoyancy conditions (such as by introducing the exemplary device or the fluidic article into a reservoir filled with a fluid appropriate for inducing neutral buoyancy).

Figure 3:
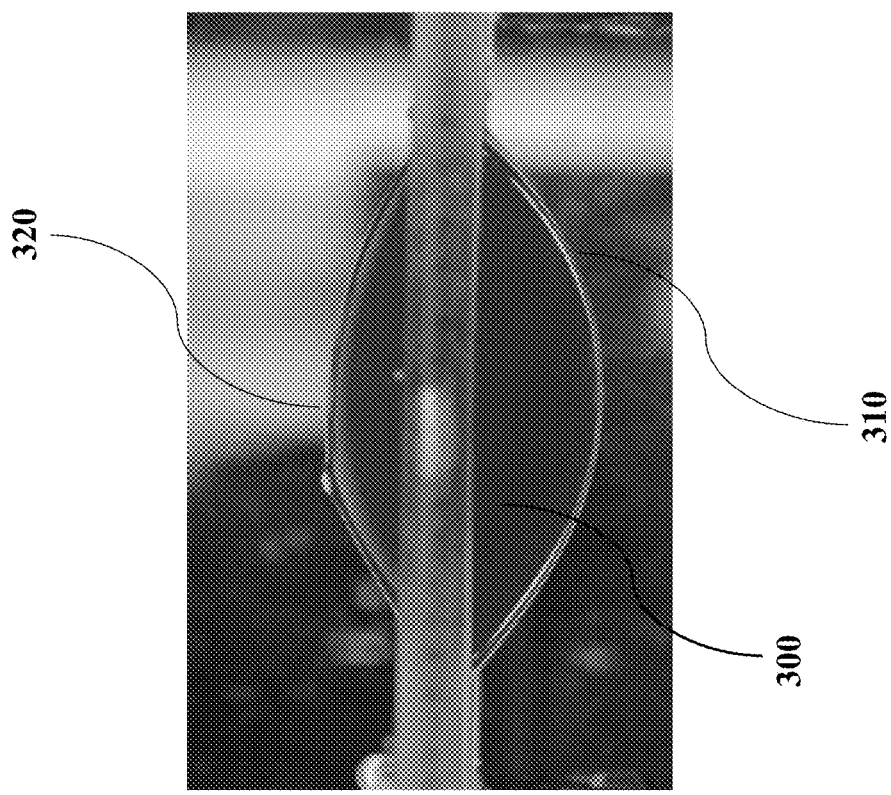
FIG. 3 presents a schematic side view of a non-limiting configuration of an exemplary fluidic lens formed under neutral buoyancy conditions.

Reference is now made to FIG. 3 demonstrating a side view of a non-limiting configuration of an exemplary fluidic article of the invention (e.g. a fluidic lens) 300.

The fluidic article may have a fluidic volume 300. The fluidic article may have a first surface 310 in contact with an ambient. The fluidic article may have a first optical surface 310 in contact with an ambient. The fluidic article comprising the fluidic volume 300 may have the first surface 310 and a second surface (e.g. a second optical surface) 320 in contact with an ambient. The first optical surface 310 and/or the second optical surface 320 may have a curvature. The first optical surface 310 and the second optical surface 320 may be defined by a first outer surface and by a second outer surface of the liquid volume. The first surface 310 and/or the second surface 320 may have individually a concave or convex shape.

In some embodiments, the device comprises a circular or an elliptical wall (e.g. in a form of a frame) in contact with the liquid volume defining a fluidic article, wherein the outer portion of the circular or an elliptical wall faces the ambient and the inner portion of the circular or an elliptical wall faces the liquid volume.

Wall

In some embodiments, the wall of the invention comprises a material selected from the group consisting of a polymeric material, a metal, a ceramic material, a composite material, or any combination thereof.

In some embodiments, the wall is in operable communication with the control unit, wherein the control unit is configured to control the geometrical shape of the wall (e.g. a dimension of the adjustable wall). Optionally, the configuration of the wall (e.g. adjustable wall) such as expanded or contracted configuration, is controllable by the control unit. In some embodiments, the control unit is configured to control the temperature of the wall.

In some embodiments, the wall is an adjustable wall. In some embodiments, the wall is a flexible wall. In some embodiments, the term "flexible" refers to bendable, adjustable, stretchable, contractible and/or expandable. In some embodiments, the term "flexible" refers to a wall having a sufficient elasticity to undergo expansion, contraction, and/or any deformation, so as to modify a geometrical shape and/or at least one dimension of the wall. In some embodiments, the flexible wall has elasticity sufficient to change its geometrical shape. In some embodiments, a fluid volume bounded by the flexible wall forms a fluidic lens with a flexible geometrical shape. In some embodiments, the fluidic article (e.g. fluidic lens) in contact with the flexible wall is characterized by a controllable or adjustable curvature and by controllable or adjustable optical properties, as described hereinbelow.

According to some embodiments, there is provided a device comprising: a housing comprising an adjustable wall having a first condensed configuration and a second expandable configuration defining a lumen; a reservoir comprising a liquid and being in fluid communication with the expandable wall; an actuator for inducing a flow of the liquid from the reservoir towards the expandable wall into the lumen; a control unit configured to control (i) configuration of the expandable wall, and (ii) the flow of the liquid through the actuator, so as to provide an article with a pre-defined shape (e.g., a fluidic lens) comprising the liquid bounded by the frame, under microgravity conditions.

In some embodiments, the housing comprises at least one adjustable wall. In some embodiments, the adjustable wall is radially adjustable, and/or in vertically adjustable. In some embodiments, the adjustable wall comprises an expandable wall and/or a contractable wall. In some embodiments, the adjustable wall is configured to adopt a contracted configuration or an expanded configuration.

In some embodiments, the device comprises a flexible or adjustable frame. In some embodiments, the wall is shapeable. In some embodiments, the wall is expandable and/or contractible. In some embodiments, the wall is foldable. In some embodiments, the fluidic article of the invention is manufactured and is stable under microgravity conditions (i.e. neutral buoyancy). In some embodiments, the geometrical shape and/or thickness of the fluidic article is predetermined by the surface tension and/or viscosity of the liquid. In some embodiments, the liquid is a liquid polymer.

In some embodiments, the device comprises at least one adjustable wall, wherein the adjustable wall comprises (i) an elastic material; and (ii) at least one opening. In some embodiments, the adjustable wall defines a lumen being in fluid communication with an ambient. In some embodiments, the lumen is in fluid communication with a reservoir comprising a liquid. In some embodiments, the fluid communication is so as to establish a flow of the liquid towards and into the lumen via the port (e.g. via a channel characterized by a dimension sufficient to support liquid flow).

Figure 4:
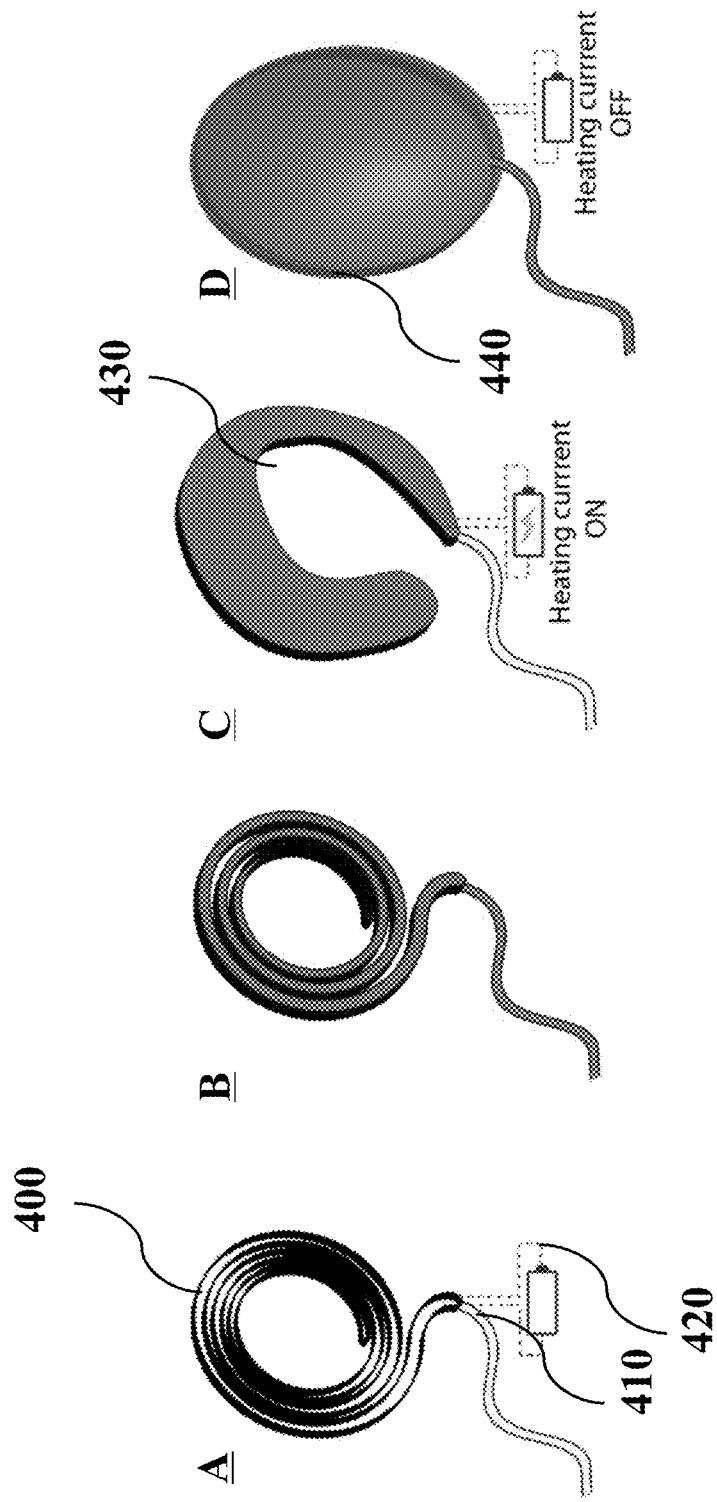
FIG. 4 presents a schematic illustration depicting a specific non-limiting exemplary configuration of the disclosed device. A pre-folded expandable frame (400) in operable communication with a heating unit (420) and with a port (410) is provided. A liquid is injected into the frame (400) via the port (410), and (under microgravity or neutral buoyancy conditions) fills it. A current is passed through the heating unit (420), so as to expose the frame (400) to Joule heating, thereby providing the frame (400) into an expanded configuration (440), thus forming a fluidic lens.

A non-limiting configuration of an exemplary device is represented by FIG. 4.

As illustrated by FIG. 4A-D, the adjustable wall (e.g. in a form of a frame) 400 may be in a contracted or a folded configuration (FIG. 4A). The adjustable wall 400 may be in fluid communication with a reservoir containing the liquid via port 410. The adjustable wall 400 may comprise a heating unit 420 in operable communication with the adjustable wall 400. The heating unit 420 may be further in operable communication with the control unit. The adjustable wall 400 in a contracted state may define a lumen. Under microgravity conditions, the liquid is injected into the lumen defined by the adjustable wall in the contracted configuration (FIG. 4B). The lumen may be filled with the liquid due to capillary action.

The adjustable wall 400 can be made of a shape memory alloy which expands into a circular shape when heated (FIG. 4C), or alternatively, a flexible material (e.g., fabric) which can be inflated or deflated into the desired shape. The adjustable wall in at least partially expanded state defines a lumen 430. Upon a stimulus and under microgravity conditions, the adjustable frame 400 may be provided into the expanded configuration 440, so as to form a circular ring, while the liquid will fill the lumen 430 forming the lens (FIG. 4D). Due to surface tension, the shape of the liquid volume bounded by the frame in the expanded configuration 440 is a spherical cap, whose curvature is dictated by the volume of the injected liquid. This allows to dynamically control the lens curvature (FIG. 4D), thus modifying its optical properties (e.g. focal length).

In some embodiments, the elastic material has an elasticity sufficient for promoting the adjustable wall from the first condensed configuration into the second expandable configuration. In some embodiments, the condensed configuration is referred to a contracted or a folded configuration of the adjustable wall.

In some embodiments, the expandable configuration is an inflated configuration. In some embodiments, the expandable configuration is an unfolded configuration. In some embodiments, the expandable configuration is an uncoiled or unwind configuration.

In some embodiments, the wall of the invention has an expandable or an unfolded region. In some embodiments, the wall of the invention has a fully expandable or a fully unfolded region. In some embodiments, the wall of the invention has a partially non-expandable region. In some embodiments, terms "deformable", "compressible", "adjustable" and "expandable" comprises any of axial, radial, longitudinal, transversal, unidirectional, and non-uniform deformation or a combination thereof.

In some embodiments, the adjustable wall is at least radially expandable. In some embodiments, the adjustable wall is radially expandable or compressible. In some embodiments, the wall is axially expandable or compressible.

In some embodiments, the device of the invention comprises a frame, at least a part of the frame comprises the adjustable wall. In some embodiments, the frame comprises one wall or a plurality of walls.

In some embodiments, a diameter or a cross-section of the frame is increased by expansion or unfolding by at least 20%, at least 30%, at least 40%, at least 50%, at least 60%, at least 70%, at least 80%, at least 90%, at least 100%, at least 1000%, at least 10.000%, at least 100.000%, at least 1000.000%, including any value therebetween.

In some embodiments, the second expandable configuration expands to a dimension (e.g. volume, length, and/or radius) suitable for forming a fluidic lens.

In some embodiments, the diameter or a cross-section of the wall in the expandable or unfolded configuration is suitable for forming a fluidic lens bounded by the wall.

In some embodiments, the expanded state comprises a fully expanded state or a partially expanded state. In some embodiments, the partially expanded state is referred to at least 10%, at least 20%, at least 30%, at least 40%, at least 50%, at least 60%, at least 70%, at least 80%, at least 90%, at least 95%, at least 98%, at least 99% expansion. In some embodiments, expansion or contraction is along a longitudinal axis, and/or along a transverse axis of the article or of the wall (or a frame). In some embodiments, expansion or contraction is a multidirectional expansion or contraction.

In some embodiments, the wall in the expanded configuration is deformable or compressible. In some embodiments, the unfolding of the wall from the contracted into the uncoiled configuration is controlled by an unfolding mechanism. In some embodiments, the unfolding mechanism comprises an actuator in operable communication with the control unit. In some embodiments, the unfolding mechanism is capable of expanding the wall in response to a signal from the control unit. In some embodiments, at least one dimension (e.g. diameter) or the geometrical shape of the wall is controllable by the unfolding mechanism.

In some embodiments, the wall has a cylindrical shape. In some embodiments, at least a part of the wall is substantially cylindrically shaped, wherein substantially is as described herein. In some embodiments, at least a part of the wall has a geometry selected from spherical, round, elliptical, conical or a combination thereof. In some embodiments, at least a part of the wall has a cylindrical geometry or shape. In some embodiments, the wall is irregular in shape, that is, it does not assume a clearly identifiable geometric configuration such as circular, square or elliptical. In some embodiments, the wall comprises a longitudinal axis and optionally a transverse axis.

In some embodiments, the wall (e.g. defining a frame) in the contracted state is in a form of a spiral. In one aspect, the wall in the contracted state has a rectangular geometry. In one aspect, the wall in the contracted state is irregular in shape. In one aspect, the wall in the expanded or uncoiled state has a geometry selected from spherical, circular, elliptical, or conical or a combination thereof. In some embodiments, the wall in the expanded or uncoiled state is irregular in shape.

In some embodiments, the adjustable wall is a hollow shaped wall. In some embodiments, the hollow shaped wall comprises an inner lumen. In some embodiments, the inner lumen of the hollow shaped wall is in fluid communication with the lumen via an opening and is further in fluid communication with the reservoir via a port, wherein the lumen is as described herein. In some embodiments, the opening, is configured to support a flow of the liquid from at least a portion of the inner lumen towards the lumen.

In some embodiments, the wall of the invention has one or more openings facing or directed towards the lumen. As used herein, the term "opening" relates to a hole, perforation, incision and/or slot, so as to allow flow of the liquid from the reservoir to the lumen. In some embodiments, the opening, as described herein, is configured to support a flow of the liquid, wherein the flow is sufficient for forming a fluidic article bounded by or enclosed within the wall. In some embodiments, the opening has a dimension (e.g. length, cross-section) suitable for supporting a predetermined flow of the liquid therethrough, wherein the predetermined flow is sufficient for forming the fluidic article of the invention.

In some embodiments, the predetermined flow is referred to a flow rate and/or volume of the liquid. In some embodiments, the predetermined flow is sufficient for providing a predetermined amount of the liquid in contact with the inner portion of the wall, wherein the inner portion of the wall provides a boundary to the liquid in contact therewith.

In some embodiments, the hollow shaped wall in the contracted configuration comprises the inner lumen at least partially filled with the liquid.

In some embodiments, the wall is at least a partially adjustable wall. In some embodiments, the wall provides a boundary to the liquid. In some embodiments, the wall (e.g. at least partially adjustable wall) provides a boundary to a portion of the liquid, wherein the portion defines the optical surface of the fluidic lens. In some embodiments, the wall substantially encloses the liquid. In some embodiments, the at least partially adjustable wall substantially defines the geometrical shape or cross-section of the fluidic article. In some embodiments, the at least partially adjustable wall predetermines the curvature of the article of the invention (e.g. a fluidic article). In some embodiments, the at least partially adjustable wall predetermines the curvature of the optical surface of a lens.

In some embodiments, the at least partially adjustable wall is expandable and/or contractable in at least one dimension. In some embodiments, the at least partially adjustable wall is expandable and/or contractable in a radial dimension. In some embodiments, the at least partially adjustable wall is further expandable and/or contractable by the expansion mechanism.

In one aspect, the expansion mechanism comprises an actuator in operable communication with the wall. The actuator may serve to provide the applied load (or "load", "actuation force" or "motive force") that may be communicated to and result in the deflection of the wall and/or an optical surface. In some embodiments, the load may be connected from the actuator to an optical surface through wall. The actuator may be configured to deliver the applied load in any desirable fashion, for example: a bending moment, concentrated load, concentric load, point load, distributed load, uniformly distributed load, fluid pressure, shear load, shear stress, surface stress (such as a radial stress or a tangential stress), stress normal to or at any angle to the optical axis, or any other desirable form of loading. In some embodiments, the actuator is as described herein. In some embodiments, the actuator comprises any of a piezoelectric actuator, a pneumatic actuator, a mechanical actuator.

Further, the load may be converted or modified in any desirable fashion, for example: amplification, conversion between stroke, rotation, pressure and/or moment modification, or any other conversion or modification of any desirable types of force or load. In one embodiment, the actuation force may be applied to a portion of the wall, resulting in a concentrated and/or distributed load being applied to the support. The applied load may result in a deformation of the wall and a movement or deflection of an optical surface.

In some embodiments, the expansion mechanism comprises a heating element and/or a current source in operable communication with the wall. In some embodiments, the expansion mechanism is configured to supply current sufficient for heating the wall.

In some embodiments, the wall is thermally adjustable. In some embodiments, the expansion mechanism in a form of a heating element is configured to control the diameter and/or the geometrical shape of the wall. In some embodiments, diameter and/or the geometrical shape of the wall is predetermined by thermal expansion or contraction.

In some embodiments, the expansion mechanism comprises the heating element in operable communication with a controller. In some embodiments, the expansion mechanism is in operable communication with the control unit. In some embodiments, the heating element is configured for heating the wall to a predetermined temperature. In some embodiments, the heating element is configured to control the temperature of the wall. In some embodiments, the heating element is configured to control the temperature of the wall and/or of the liquid.

In some embodiments, the wall comprises a shape memory substrate (e.g. shape memory alloy). In some embodiments, diameter and/or the geometrical shape of the shape memory substrate is controllable by exposure to a thermal radiation. In some embodiments, diameter, curvature and/or the geometrical shape of the shape memory substrate is controllable by the heating element.

In some embodiments, the wall is an adjustable wall comprising a substrate selected from an elastic polymeric substrate, a textile substrate and a shape memory substrate.

In some embodiments, the wall comprises an elastic polymer or a viscoelastic polymer. Such polymers are known in the art, including but are not limited to polyvinylchloride, polyethylene, polyester, polyisoprene, polyether, latex, rubber, polyurethane, etc.

In some embodiments, the wall comprises an elastic fibrous substrate. Such elastic fibers are known in the art, including but are not limited to neoprene, spandex, elastane, an elastic electrospun fiber, etc.

In some embodiments, the adjustable wall and/or the substrate has a sufficient elasticity to remain stable upon multiple shifts or changes from the contracted state to the expanded state of the device or vice versa. In some embodiments, the wall has a sufficient elasticity and/or mechanical properties to remain stable upon multiple shifts or changes from the contracted state to the expanded state or vice versa.

In some embodiments, the wall (e.g. adjustable wall) comprises a shape memory substrate. In some embodiments, the shape memory substrate is selected from the group consisting of a shape memory alloy, a shape memory ceramic, and a shape memory polymer or any combination thereof. Shape memory materials are capable of expanding so as to recover their original shape from a significant and seemingly plastic deformation when a particular stimulus is applied. In some embodiments, the stimulus is a thermal energy, light, pressure, electrical current, etc. In some embodiments, the shape memory substrate comprises a thermo-responsive material. Various shape memory substrates are well-known in the art, including inter alia copper-aluminum-nickel, nickel-titanium, Fe—Mn—Si, Cu—Zn—Al, Cu—Al—Ni, PEO-PET and polynorbornene.

In some embodiments, a dimension of the wall (e.g. height, diameter) is adapted for binding or enclosing a predetermined volume of the liquid. In some embodiments, the predetermined volume is sufficient for shaping the lens with a predefined dimension. In some embodiments, the height of the wall is sufficient for supporting the predetermined volume of the liquid.

In some embodiments, at least a portion of the wall (e.g. the inner portion of the wall configured to be in contact with the liquid) is wettable by the liquid. In some embodiments, the affinity of the liquid to at least a portion of the wall is sufficient for preventing separation of the liquid from the wall. In some embodiments, the liquid has an affinity to the wall greater than the affinity to the ambient. In some embodiments, a contact angle of the liquid on top of the wall (e.g. the inner portion of the wall configured to be in contact with the liquid) is less than 90°.

In some embodiments, the wall is configured to provide a physical boundary to the liquid and/or the lens. In some embodiments, the wall is configured to prevent form the liquid to escape into the ambient (due to neutral buoyancy). In some embodiments, the wall is sufficiently stable for use under the operable conditions, as described herein. In some embodiments, the wall has a sufficient mechanical and chemical stability (with response to parameters such as mechanical deformation, deformation due to thermal expansion, UV/vis radiation) to provide a support (e.g. frame or housing) for the liquid and/or lens.

In some embodiments, the wall is gradually adjustable. In some embodiments, the wall is capable of gradually changing from the contracted state to the expanded state or vice versa. In some embodiments, the wall changes from the contracted state to the expanded state or vice versa upon a stimulus, as described herein. In some embodiments, the wall operable communication with an expansion mechanism, wherein the expansion mechanism is capable of providing the wall from the contracted state to the expanded state or vice versa.

Liquid

In some embodiments, the liquid is in a liquid state under operable conditions. In some embodiments, the liquid is curable. In some embodiments, the liquid comprises an organic solvent.

In some embodiments, the liquid is characterized by surface tension and viscosity sufficient for shaping or forming the article of the invention under operable conditions (e.g. space conditions).

In some embodiments, the liquid is a liquid polymer. In some embodiments, the liquid polymer is a hydrophobic polymer. In some embodiments, the liquid polymer is a hydrophilic polymer. In some embodiments, the liquid polymer is a gel (e.g., a cross-linked gel). In some embodiments, the liquid polymer composing the fluidic lens is in a liquid state under operable conditions such as temperature, pressure, and gravity in space (e.g. outer space, and/or near earth space).

In some embodiments, the operable conditions comprise a pressure below 0.1 Pa and a temperature between −200 and 150° C., between −150 and −100° C., between −100 and −50° C., between −50 and 0° C., between −10 and 0° C., between 0 and 5° C., between 5 and 10° C., between 10 and 20° C., between 20 and 50° C., between 50 and 100° C., including any range or value therebetween. In some embodiments, the operable conditions further comprise microgravity conditions.

In some embodiments, the term "microgravity" refers to a gravity being about $1/5$, about $1/10$, about $1/100$, or about $1/1000$ of the gravity on the Earth surface or less. A skilled artisan will appreciate, that such microgravity conditions may be achieved for example in space, at a distance of about 200,000 km from Earth's surface or more, or during a free fall (e.g. in the Earth's atmosphere or in an Earth orbit). In some embodiments, the term "microgravity" refers to gravity conditions on the surface of the Moon.

In some embodiments, the liquid is substantially inert (i.e., non-reactive) to light irradiation. In some embodiments, the liquid is substantially inert to UV radiation. In some embodiments, the liquid is substantially inert to UV and/or visible light radiation.

In some embodiments, the liquid (or the optical compartment of the optical article of the invention (e.g. lens, and/or mirror)) comprises a non-polymeric liquid (e.g. an ionic liquid, an organic solvent, a hydrophobic liquid, an aqueous solution etc.). In some embodiments, the liquid is or comprises an ionic liquid. Various ionic liquids are known in the art and usually comprise cationic organic compounds for example imidazolium or pyridinium salts, such as 1-ethyl-3-methylimidazolium salt (EMIM), 1-butyl-3,5-dimethylpyridinium bromide, etc.

In some embodiments, the liquid is or comprises a chalcogenide glass, comprising one or more chalcogens such as S, Se, Te; and one or more of Ge, Ga, As, Sb, Bi, Pb, Sn, In, and optionally a lanthanide element. Various chalcogenide glasses are known in the art and are extensively utilized for the formation of IR lenses. Exemplary chalcogenide glasses are GeSbTe, AgInSbTe, InSe, SbSe, SbTe, InSbSe, InSbTe, GeSbSe, GeSbTeSe and AgInSbSeTe, arsenic trisulfide, germanium sulfide, and gallium lanthanum sulfide.

In some embodiments, the liquid is substantially non-curable or does not polymerize upon exposure to UV and/or visible light radiation. In some embodiments, the liquid is substantially non-curable or does not polymerize upon exposure to a thermal radiation. In some embodiments, the liquid is devoid of a curable polymer.

In some embodiments, the liquid of the invention is in a liquid state under operable conditions. In some embodiments, the liquid of the invention retains at least 70%, at least 80%, at least 90%, at least 95%, at least 97%, at least 99% including any range between, of its flowability under operable conditions. In some embodiments, the liquid of the invention has a viscosity and/or surface tension sufficient for retaining at least 70%, at least 80%, at least 90%, at least 95%, at least 97%, at least 99% including any range between, of at least one of: (i) structural integrity, (ii) geometrical shape under operable conditions. In some embodiments, the liquid of the invention has a viscosity of at least 1 cP, at least 5 cP, at least 10 cP, at least 20 cP, at least 30 cP, at least 50 cP, at least 100 cP, at least 1000 cP, including any range between.

In some embodiments, the liquid of the invention has a viscosity sufficient for substantially retaining the structural integrity and/or geometrical shape thereof under operable conditions. In some embodiments, the liquid composing the liquid lens of the invention, has a viscosity sufficient for substantially retaining any of: (i) structural integrity, (ii) geometrical shape, (iii) optical property of the liquid lens under operable conditions.

In some embodiments, the liquid of the invention is characterized by a melting point and/or a boiling point so that the liquid is in the liquid state under operable conditions. In some embodiments, the liquid of the invention is characterized by a melting point of at least −250° C., at least −150° C., at least −100° C., at least −50° C., at least 0° C., including any range between. In some embodiments, the liquid of the invention is characterized by a melting point of at most −250° C., at most −150° C., at most −100° C., at most −50° C., at most 0° C., including any range between.

In some embodiments, the liquid of the invention is characterized by a boiling point of at least 100° C., at least 150° C., at least 200° C., at least 300° C., at least 400° C., including any range between. In some embodiments, the liquid of the invention is characterized by a boiling point of at most 100° C., at most 150° C., at most 200° C., at most 300° C., at most 400° C., including any range between.

In some embodiments, the liquid is substantially transparent in a UV-Vis and/or IR range. In some embodiments, the liquid has a transparency in a UV-Vis and/or IR range. In some embodiments, the liquid is substantially transparent in a UV-Vis and/or the IR range.

In some embodiments, the liquid has an absorbance in a specific wavelength range within the UV/vis range. In some embodiments, the liquid has an absorbance in a range from 180 to 230 nm, from 230 to 250 nm, from 250 to 280 nm, from 280 to 300 nm, from 300 to 350 nm, from 350 to 400 nm, from 400 to 450 nm, from 450 to 500 nm, from 500 to 600 nm, from 600 to 700 nm, from 700 to 800 nm, from 800 to 1000 nm, from 1000 to 1500 nm, from 1500 to 3000 nm, including any range between.

In some embodiments, the liquid comprises an additive, such as a dye. In some embodiments, the liquid has an absorbance in a specific wavelength range, wherein the range is as described hereinabove. In some embodiments, the additive is a fluorophore or a luminophore.

In one aspect, the liquid or the liquid polymer has an increased affinity to the inner portion of the wall. In some embodiments, the liquid or the liquid polymer has an affinity to the inner portion of the wall greater than the affinity to the ambient. In some embodiments, the affinity of the liquid or of the liquid polymer to the inner portion of the wall is sufficient for preventing separation (e.g. detachment) thereof from the wall.

Control Unit

In some embodiment, device of the invention comprises the control unit, wherein the control unit comprises an electronic circuitry unit. In some embodiments, the control unit is remotely controlled (e.g. from Earth). In some embodiments, the control unit is configured to receive a signal from a remote control station, wherein the control station is optionally located on the Earth. In some embodiments, the location of the control station and the location of the device of the invention comprising the control unit, are different locations (e.g. on the Earth's surface and in space, or at a near Earth orbit). In some embodiments, upon receiving the signal form the control station, the control unit is configured to control the actuator and/or the expansion mechanism, so as to induce flow of the liquid, to obtain the article of the invention. In some embodiments, the control unit is configured to receive data from the control station, wherein data comprises inter alia the predetermined volume of the liquid and/or the predetermined curvature of the article.

In some embodiments, the control unit is in operable communication with any of: the wall, the actuator, and/or the port, as described herein. In some embodiments, the control unit is configured to control the actuator, so as to induce flow of the liquid form the reservoir towards the lumen via one or more ports. In some embodiments, the control unit is configured to control the actuator, so as to induce flow of the liquid form the lumen towards the reservoir via one or more ports. In some embodiments, the control unit is configured to control flow of the liquid. In some embodiments, the control unit is configured to control flow capacity (e.g. flow capacity of the one or more ports).

In some embodiments, the control unit is configured to control a dimension (e.g. cross section and/or geometrical shape) of the wall. In some embodiments, the control unit is configured to control a configuration of the wall (e.g. expanded or contracted configuration). In some embodiments, the control unit is configured to provide the wall from the at least partially contracted configuration into at least partially expanded configuration, or vice versa.

In some embodiments, the control unit is configured to calculate a volume of the liquid. In some embodiments, the control unit is configured to calculate predetermined volume of the liquid. In some embodiments, the control unit is configured to calculate a volume of the liquid sufficient for shaping an article of the invention having a pre-defined curvature. In some embodiments, the control unit is configured to adjust or modify the curvature of the article. In some embodiments, the control unit is configured to calculate the flow rate of the liquid, sufficient for shaping of the article. In some embodiments, the control unit is configured to calculate the expansion rate of the wall and the flow rate of the liquid, sufficient for shaping of a fluidic article of the invention (e.g. fluidic lens).

In some embodiments, the control unit is configured to control the temperature of the heating element, thereby controlling the temperature of the liquid and/or of the wall. In some embodiments, the control unit is configured to: (i) receive a pre-defined curvature of the article of the invention; and (ii) control the actuator to induce flow of the liquid according to the received pre-defined curvature. In some embodiments, the control unit is configured to: (i) receive a pre-defined curvature of the article of the invention; and (ii) control the actuator to induce flow of the liquid and to substantially fill the lumen so as to form the article with a pre-defined curvature.

In some embodiments, the control unit is or comprises a computer program product. In some embodiments, the control unit comprises at least one hardware processor; and a non-transitory computer-readable storage medium having stored thereon program instructions, the program instructions executable by the at least one hardware processor to: receive data comprising (i) a surface tension of the liquid of the invention, (ii) a dimension of the wall (or frame) and optionally (iii) acceleration force exerted on the device of the invention; and to calculate the curvature of the article based on the received data. In some embodiments, the control unit comprises at least one hardware processor; and a non-transitory computer-readable storage medium having stored thereon program instructions for executing methods according to embodiments if the invention. In some embodiments, the program instructions executable by the at least one hardware processor to: receive a predefined curvature of the article and to receive data comprising (i) a surface tension of the liquid of the invention, (ii) a dimension of the wall (or frame) and optionally (iii) acceleration force exerted on the device of the invention; and wherein the control unit is further configured to control the actuator to induce flow of the liquid based on the received data and according to the received pre-defined curvature.

In some embodiments, the program instructions executable by the at least one hardware processor to: determining, by the control unit, a volume of liquid sufficient for filling the lumen with the liquid; controlling the actuator by the control unit to induce flow of the volume of the liquid towards the port, so as to obtain the article of the invention.

In some embodiments, the control unit comprises at least one hardware processor; and a non-transitory computer-readable storage medium having stored thereon program instructions, the program instructions executable by the at least one hardware processor to: receive data comprising (i) a surface tension of the liquid of the invention, (ii) a dimension of the wall (or frame) and optionally (iii) acceleration force exerted on the device of the invention; and to receive a pre-defined curvature of the article; and wherein the control unit is further configured to control a dimension of the adjustable wall, and optionally an acceleration force exerted on the device based on the received data and on the received pre-defined curvature.

The present invention may be a system, a method, and/or a computer program product.

Optionally, the computer program product comprises a computer-readable storage medium. The computer-readable storage medium may have program code embodied therewith. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), via a satellite internet connection or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention In some embodiments remote connection is via radio waves (e.g. in the microwave range).

Aspects of the present invention are described herein with reference to drawings and/or diagrams of methods, apparatus (systems), and computer program products according to embodiments of the invention. It will be understood that each illustration and/or drawing, and combinations thereof, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the drawings. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the drawings.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the drawings.

In some embodiments, the program code is excusable by a hardware processor. In some embodiments, the hardware processor is a part of the control unit.

In some embodiments, there is further provided a read-out of the assay carried out in the disclosed system or device may be detected or measured using any suitable detection or measuring means known in the art. The detection means may vary depending on the nature of the read-out of the assay. For example, for assays providing a fluorescent read-out, the detection means may include a source of fluorescent light at an appropriate wavelength to excite the fluorophores in the reaction sites and means detect the emitted fluorescent light at the appropriate wavelength. The excitation light may be filtered using a bandwidth filter before the light is collimated through a lens. The same (e.g., Fresnel) lens may be used for focusing the illumination and collection of the fluorescence light. Another lens may be used to focus the fluorescent light onto the detector surface (e.g., a photomultiplier-tube). Fluorescent read-outs may also be detected using a standard fluorescent microscope fitted with a CCD camera and software. In some embodiments, disclosed system also relates to an apparatus including the fluidic lens device in any embodiments thereof, and a detection means as described herein.

Article

In some embodiments, the article of the invention is or comprises a fluidic article formed or defined by a fluid volume. In some embodiments, the article of the invention is an optical article or an optical device, such as an optical lens or an optical mirror. In some embodiments, the article is a fluidic lens. In some embodiments, the article is a fluidic mirror. In some embodiments, the device is a fluidic optical device. In some embodiments, the article of the invention is a cured or hardened article.

In some embodiments, the device of the invention is configured to form or shape an article under operable conditions (such as microgravity conditions). In some embodiments, the device of the invention is in contact with or bound to the article of the invention (e.g. under microgravity conditions). In some embodiments, the wall of the device of the invention is in contact with or bound to the article (e.g. under microgravity conditions).

In one embodiment, the wall in contact with the liquid volume forms an optical component, or an optical device such as an optical lens or a fluidic lens. In some embodiments, at least a part of the perimeter of the wall is in contact with or bound to the liquid volume, so as to maintain the pre-defined shape and/or curvature of the fabricated article (e.g. under microgravity conditions).

In some embodiments, the article of the invention has a pre-defined geometrical shape. In some embodiments, the article of the invention has a pre-defined curvature. In some embodiments, the fluidic article of the invention has an adjustable geometrical shape and/or curvature. In some embodiments, the article of the invention is a fluidic article formed or defined by a fluid volume. In some embodiments, the article of the invention is an optical article or an optical device, such as an optical lens or an optical mirror. In some embodiments, the article is a fluidic lens. In some embodiments, the device is a fluidic optical device, e.g. a fluidic lens.

In some embodiments, the fluidic lens has an optical axis. In some embodiments, the fluidic lens has a predetermined focal length.

In some embodiments, an optical property of the fluidic optical article of the invention (e.g. a fluidic lens) is variable by controlling any of (i) the volume of the liquid, (ii) the configuration of the wall, and optionally by controlling acceleration force exerted on the device of the invention in contact with the fluidic lens (also referred to herein, as "fluidic optical device").

In some embodiments, an optical property of the optical article is controllable by varying at least one dimension (e.g. diameter, curvature) of the optical surface. In some embodiments, an optical property of the fluidic lens is controllable by varying at least one dimension of the wall (e.g. in a form of a frame), and/or a geometrical shape thereof; wherein at least one dimension comprises a radial dimension (or cross-section), a vertical dimension (e.g. height), or both.

In some embodiments, the controllable optical property of the fluidic lens is selected from focal length, light scattering, point spread function, aberration, conic constant and wave front scattering, or any combination thereof. In some embodiments, the optical surface and/or the lens is substantially transparent at a desired wavelength of light. In some embodiments, the optical surface and/or the lens may be reflective, diffractive, scattering, and holographic or have any other desirable optical property.

In some embodiments, the absorbance wavelength and/or transparency of the fluidic lens device is variable by changing the chemical composition of the liquid.

In some embodiments, the article of the invention is devoid of a membrane or a packaging material in contact with the surface (e.g. outer surface) of the liquid volume. In some embodiments, the article of the invention is devoid of a membrane or a packaging material in contact with the surface (e.g. outer surface) of the article.

In some embodiments, the lens of the invention is devoid of a membrane (e.g. a solid polymeric membrane) in contact with the optical surface. In some embodiments, the fluidic lens device is in operable communication with the control unit.

In some embodiments, the article of the invention is in a solid state. In some embodiments, the article of the invention is a hardened or cured article. In some embodiments, the article of the invention comprises any cured article, such as a tool or a replacement part. The device of the invention may be utilized for example in additive (e.g. replacement parts) manufacturing in space, such as on board the international space station (ISS).

In some embodiments, the cured article is a cured optical article (e.g. a cured lens, or an optical mirror).

In some embodiments, the cured article is bound to or enclosed by the wall of the device. In some embodiments, the cured article is detachable form the wall and/or device comprising thereof.

In some embodiments, the article has a predetermined geometrical shape and/or curvature. In some embodiments, the shape of the article of the invention is at least partially pre-defined by the geometrical form of the frame and/or of the wall. In some embodiments, at least one dimension of the article is pre-defined by the geometrical shape of the frame and/or of the wall. In some embodiments, a radial dimension of the article is pre-defined by the geometrical form of the frame and/or of the wall. In some embodiments, the cross-section of the article is pre-defined by the geometrical form of the frame and/or of the wall of the invention. In some embodiments, the shape of the article comprises a curvature of at least one surface of the article. In some embodiments, the article (e.g. fluidic lens) has at least one surface with a predetermined curvature. In some embodiments, the fluidic article (e.g. fluidic lens) has at least one optical surface with a predetermined curvature.

In some embodiments, the fluidic article is defined by the fluidic volume. In some embodiments, the fluidic article comprises a first surface in contact with an ambient and a second surface in contact with an ambient. In some embodiments, the first surface and the second surface are defined by a first outer surface and by a second outer surface of the liquid volume. In some embodiments, the first surface and/or the second surface are individually characterized by a concave or convex shape.

In some embodiments, the curvature of at least one surface of the article is predetermined by at least one of: (i) a surface tension, viscosity and a volume of the liquid, (ii) a configuration of the wall and optionally by (iii) acceleration force exerted on the device and/or the fluidic lens. In some embodiments, the control unit is configured to: (i) receive a pre-defined curvature of the article; and (ii) control the actuator to induce flow of the liquid according to the received pre-defined curvature, thus forming the article of the invention.

In some embodiments, the fluidic article of the invention is an optical article. In some embodiments, the first surface and the second surface of the fluidic article are optical surfaces. In some embodiments, the geometrical shape of the optical surface is variable. In some embodiments, the diameter of the optical surface is variable.

In some embodiments, the optical surface comprises a first surface and a second surface. In some embodiments, the first surface and the second surface are curved surfaces. In some embodiments, the article comprises the first surface having a positive curvature and the second surface having a negative curvature. In some embodiments, the article comprises the first surface having a negative curvature and the second surface having a positive curvature. In some embodiments, the first surface and the second surface are spherical surfaces.

In some embodiments, the optical surface is in a form of a biconvex lens. In some embodiments, the curvature of the optical surface is variable. In some embodiments, the first optical surface, the second optical surface define a lumen (e.g. fluid volume), referred to as optical compartment or lens. In some embodiments, the curvature of the optical surface or of the optical compartment is controllable by varying (i) the volume of the liquid, and (ii) by the diameter of the at least partially expanded wall. In some embodiments, the curvature of the optical surface is variable. In some embodiments, the curvature of at least one optical surface of the optical compartment is predetermined by a surface tension of the liquid.

In some embodiments, the first optical surface, the second optical surface or both are characterized by a constant mean curvature. In some embodiments, at least 80%, at least 85%, at least 90%, at least 92%, at least 95%, at least 96%, at least 97%, at least 98%, at least 99% of the first surface and/or of the second surface is characterized a constant mean curvature. In some embodiments, a standard deviation of the constant mean curvature is between 0.01 and 10%, between 0.01 and 0.05%, between 0.05 and 0.1%, between 0.1 and 0.5%, between 0.5 and 1%, between 1 and 3%, between 1 and 5%, between 5 and 10%, between 5 and 7%, between 7 and 10% including any range or value therebetween.

In some embodiments, the first optical surface, the second optical surface or both are characterized by a non-uniform curvature. In some embodiments, the article of the invention is characterized by a non-uniform geometrical shape. In some embodiments, the article of the invention is characterized by at least one a non-uniform dimension (e.g. non-uniform height).

In some embodiments, the lens height is at least 0.1 mm, at least 4 mm, at least 6 mm, at least 8 mm, at least 10 mm, at least 12 mm, at least 15 mm, at least 20 mm, at least 30 mm, at least 40 mm, at least 50 mm, at least 60 mm, at least 70 mm, at least 80 mm, at least 90 mm, at least 100 mm, at least 200 mm, at least 500 mm, at least 1000 mm, including any range between.

In some embodiments, the lens height is predetermined by (i) the volume of the liquid, and (ii) by the diameter of the wall, as described herein.

In some embodiments, the lens height is the height of a spherical cap (curved optical surface) relative to the wall edge of the lens. In some embodiments, the lens height is a horizontal height or the maximal thickness of the lens.

In some embodiments, the lens diameter substantially corresponds to the diameter of the expanded frame (or of the wall of the device, as described herein). In some embodiments, the article of the invention (e.g. an optical article, such as a lens) has a diameter ranging from 1 cm to 100 m, from 1 cm to 10 cm, from 10 cm to 100 cm, from 10 cm to 50 cm, from 50 cm to 100 cm, from 1 to 2 m, from 2 to 5 m, from 5 to 10 m, from 10 to 20 m, from 20 to 30 m, from 30 to 40 m, from 40 to 50 m, from 50 to 70 m, from 70 to 100 m, including any range therebetween.

In some embodiments, the article of the invention is in a form of a mirror (e.g. convex or concave optical mirror). In some embodiments, the article of the invention in a form of a mirror comprises the fluidic or a hardened article of the invention in contact with a reflective outer surface. In some embodiments, the reflective outer surface comprises a metal. In some embodiments, the metal is characterized by a melting temperature compatible with the operable conditions. In some embodiments, the metal is characterized by a melting temperature suitable for processing in the device of the invention. In some embodiments, the metal is characterized by a melting temperature of at most 200° C., at most 150° C., at most 100° C., at most 80° C., at most 60° C., at most 50° C., including any range therebetween. Exemplary metals suitable herein are low melting point metals, such as Ga, Hg, Bi, Sn, In, and Pb, including any alloy or any combination thereof.

In some embodiments, the article of the invention is substantially stable under operable conditions. As used herein the term "stable" refers to the capability of the article to substantially maintain its structural and/or mechanical integrity. In some embodiments, the composition is referred to as stable, if the composition is characterized by a sufficient mechanical integrity under operable conditions. In some embodiments, operable conditions comprise UV-visible light irradiation, temperature and pressure as described herein. In some embodiments, the stable article is chemically inert under operable conditions. In some embodiments, the stable article maintains its optical property under operable conditions.

System

In another aspect of the invention, there is provided a system comprising one or more of the articles and/or devices of the invention. In some embodiments, the system comprises a plurality of devices and/or articles of the invention (e.g. fluidic and/or cured optical devices) positioned along an optical axis of the system. In some embodiments, the system comprises a plurality of devices and/or articles of the invention positioned within a compartment or container. In some embodiments, the compartment has a constant gas pressure. In some embodiments, the compartment is in optical communication with the optical surface of the fluidic lens device. In some embodiments, the compartment is substantially transparent within the UV/vis and/or the IR range. In some embodiments, the compartment is configured to isolate the device from the ambient (e.g. space).

Figure 5:
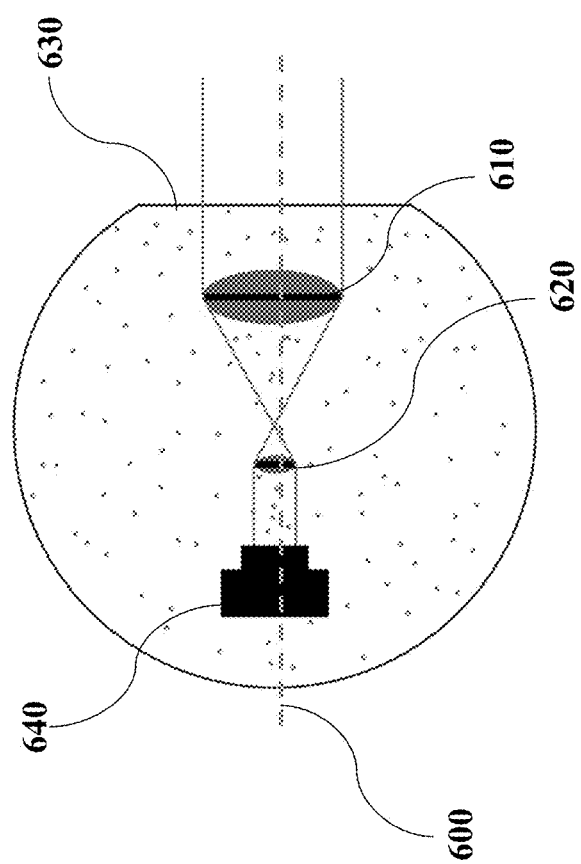
FIG. 5 presents a schematic illustration depicting a specific non-limiting exemplary configuration of the disclosed system (e.g. telescope).

In one aspect, the system comprises a plurality of devices of the invention (e.g. fluidic and/or cured optical devices and optionally one or more optical mirrors) positioned within a compartment and, wherein the plurality of devices is positioned along an optical axis of the system. In some embodiments, the system is in a form of a telescope. A non-limiting example of the system is represented by FIG. 5.

The system may comprise a first fluidic lens device 610. The system may comprise a compartment 630 filled with gas. At least a part of the compartment 630 may be transparent within the UV/vis and/or the IR range and in optical communication with the first fluidic lens device 610. The system may comprise a second fluidic lens device 620 in optical communication with the first fluidic lens device 610. The system may further comprise a light sensor 640 in optical communication with the second fluidic lens device 620 and optionally with the first fluidic lens device 610. The light sensor 640 may be a part of an image recording device (e.g. a camera). The first fluidic lens device 610, the second fluidic lens device 620 and optionally the light sensor 640 may be positioned along an optical axis 600. The optical axis 600 may be a longitudinal axis of the system.

In some embodiments, the plurality of fluidic optical devices are in optical communication with each other.

In some embodiments, the system further comprises a light sensor and a control unit. In some embodiments, the system further comprises one or more optical mirrors in operable communication with the fluidic lens device and with the light sensor. In some embodiments, the control unit is in operable communication with any one of the elements (e.g. devices) of the system, wherein the control unit is as described herein.

In some embodiments, the system is or comprises a solar concentrator. In some embodiments, the solar concentrator comprises a plurality of optical mirrors, as described herein, in optical communication with an absorber.

Method

In another aspect, there is provided a method, comprising:
(i) providing the device of the invention,
(ii) under operable conditions (such as microgravity conditions) via the actuator, inducing flow of a predetermined volume of the liquid via the port, so as substantially fill the lumen with the predetermined volume of the liquid, thereby obtaining an article of the invention, and wherein the predetermined volume of the liquid is sufficient for shaping the article of the invention (e.g. an article with a pre-defined curvature).

In some embodiments, the method of the invention is for fabricating the article of the invention. In some embodiments, the method of the invention is for fabricating or shaping an article with a pre-defined shape under microgravity conditions. In some embodiments, the method is for fabricating an optical component (e.g. a lens). In some embodiments, the method of the invention is for fabricating a lens under microgravity conditions (i.e. neutral buoyancy).

In some embodiments, the step (ii) of the method of the invention comprises controlling the actuator by the control unit, to induce flow of a predetermined volume of the liquid from the reservoir towards the port and to substantially fill the lumen with the predetermined volume of the liquid. In some embodiments, step (ii) is performed by inducing a motion of the actuator by the control unit, so as to induce or modify flow of the liquid. In some embodiments, the predetermined volume of the liquid is sufficient for obtaining the article with a predefined geometrical shape and/or curvature. In some embodiments, the article is a fluidic article enclosed with or bounded by the wall of the device, as disclosed herein.

In some embodiments, step (ii) comprises: receiving the pre-defined curvature of the article by the control unit; calculating the predetermined volume of the liquid based on: a surface tension of the liquid, a dimension or shape of the wall and optionally on acceleration force exerted on the device; and further comprises controlling the actuator by the control unit, to induce flow of the liquid according to the calculated predetermined volume of the liquid.

In another aspect, there is provided a method for manufacturing the article of the invention comprising: (i) providing the device of the invention comprising the adjustable wall, wherein the adjustable wall is in the first condensed configuration, (ii) providing the wall from the first condensed configuration into at least partially expanded configuration, and (iii) controlling the actuator by the control unit, to induce flow of a predetermined volume of the liquid from the reservoir towards the port and to substantially fill the lumen with the predetermined volume of the liquid, so as to obtain a fluidic article; wherein: steps (ii) and (iii) are performed under operable conditions (e.g. under microgravity conditions). In some embodiments, step (ii) comprises at least partially expanding the adjustable wall via an expansion mechanism, as described herein. In some embodiments, at least partially expanding is controlled by the control unit. In some embodiments, the method of the invention is performed under microgravity conditions (i.e. neutral buoyancy). In some embodiments, steps (ii) and (iii) are performed simultaneously or subsequently.

In some embodiments, the predetermined volume is sufficient for (i) substantially filling the lumen with the liquid and (ii) for shaping the article (e.g. fluidic article) according to the predetermined geometrical shape and/or curvature. In some embodiments, the predetermined volume is sufficient for manufacturing the fluidic lens with a predetermined curvature. In some embodiments, the curvature of at least one surface of the fluidic lens is predetermined by a dimension of the wall and by the volume of the liquid.

In another aspect of the invention, there is a method of controlling the device of the invention, the method comprises: determining, by the control unit, a volume of liquid sufficient for filling the lumen with the liquid; and controlling the actuator by the control unit to induce flow of the volume of the liquid towards the port, so as to obtain the article of the invention. In some embodiments, determining is based on the program instructions, as described herein. In some embodiments, controlling is remotely controlling via signal sent from the control station (e.g. wherein the control station is located on Earth). In some embodiments, the method comprises remotely controlling the control unit, thereby obtaining the article of the invention, wherein remotely is from the control station located on Earth.

In some embodiments, the device comprises an adjustable wall in a condensed configuration, and the method further comprises at least partially expanding the adjustable wall, and wherein the at least partially expanding and the inducing the flow are performed simultaneously or subsequently.

In some embodiments, the predetermined volume is sufficient for (i) filling the lumen with the liquid and (ii) for forming the article according to a predetermined curvature.

In some embodiments, the method further comprises controlling (via the control unit) a curvature of the article by modifying at least one of: a) a volume of the liquid (e.g. liquid filling the lumen); b) at least one dimension of the wall (e.g. cross-section and/or geometrical shape); and optionally by modifying acceleration force exerted on the device. In some embodiments, controlling the curvature (also referred to herein, as step iii) is performed by inducing a motion of the actuator by the control unit, so as to induce or a flow of the liquid from the reservoir towards and into the lumen, or vice versa (from the lumen towards the reservoir), thereby modifying the curvature of the fluidic article of the invention.

Figure 6:
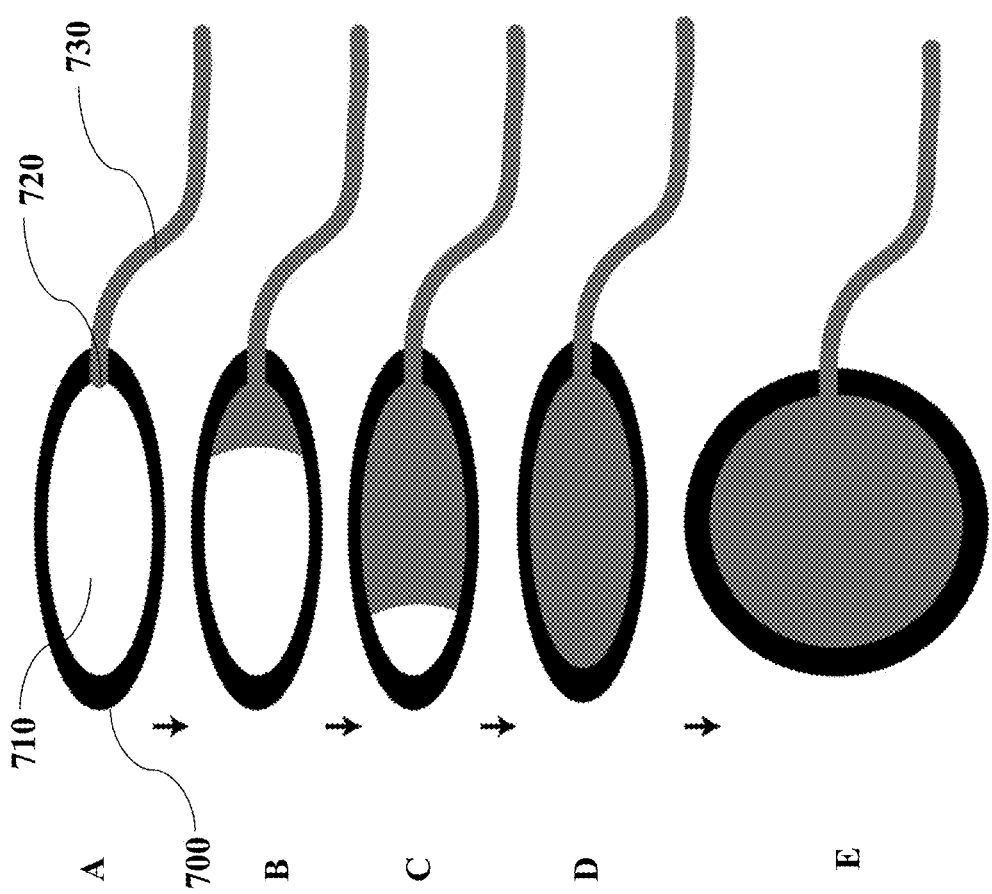
FIG. 6 presents a schematic top view depicting a specific non-limiting exemplary step-wise formation of the disclosed article (e.g. fluidic lens).

In some embodiments, the method is as exemplified in FIG. 6. FIG. 6A represents a device comprising a wall or frame (e.g. in a partially expanded state) 700 defining a lumen 710 and having an opening 720 in liquid communication with a channel 730. The channel 730 may be filled with the liquid. FIG. 6B represents the step (ii) of the method, comprising injecting the liquid into the lumen 710 via the opening 720. FIG. 6C represents the step (ii) of the method, comprising gradually injecting a predetermined volume of the liquid into the lumen 710 via the opening 720.

FIG. 6D represents formation of a fluidic article (e.g. fluidic lens), wherein the liquid substantially fills the lumen 710. FIG. 6E represents step (iii) of the method by controlling a dimension of the wall 700 (e.g. changing the geometrical shape of the wall) thereby changing the curvature of the fluidic lens.

In some embodiments, the method further comprises step (iv) of providing the liquid under conditions sufficient for curing or hardening, thereby manufacturing a cured or hardened article of the invention. In some embodiments, the step (iv) is performed after performing the step (ii) and or (iii). In some embodiments, the step (iv) and step (ii) are performed simultaneously.

In some embodiments, the liquid is a hardenable liquid (e.g. configured to undergo at least partial hardening under suitable conditions, such as chemical cross-linking or curing, UV-induced crosslinking or curing, and/or thermal cross-linking or curing). In some embodiments, the liquid is a curable liquid. In some embodiments, the liquid comprises a polymer. In some embodiments, the polymer comprises a cross-linkable polymer. In some embodiments, the polymer comprises a thermoset polymer.

Polymerizing or curing can be carried out in any manner, such as for instance, irradiating with electromagnetic or thermal radiation having sufficient energy to initiate a polymerization or a cross-linking reaction. In some embodiments, the liquid and/or the liquid polymer comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some embodiments, comprises a free radical polymerization. Polymerizing or curing, as used herein refers to a hardening process, resulting in a substantially solid article. In some embodiments, the cured article refers to a stable article, wherein stable is as described herein.

Optionally, the liquid polymer refers to a composition comprising at least one of: a monomer, an oligomer, a polymer or a mixture thereof, wherein the composition is at least partially polymerizable (e.g. via free-radical polymerization) upon exposure to light in the UV and/or visible range. In some embodiments, the liquid polymer comprises any methacrylate or acrylate resin which polymerizes upon exposure to UV light. In some embodiments, the polymerization occurs in the presence of a free radical photoinitiator. In some embodiments, the liquid polymer comprises one or more low molecular weight materials, such as methacrylates, dimethacrylates, triacrylates, and diacrylates, or any combination thereof.

In some embodiments, a photoinitiator comprises an alpha-cleavage type (unimolecular decomposition process) photoinitiator or a hydrogen abstraction photosensitizer-tertiary amine synergist, operable to absorb UV light, preferably between 200 nm and 400 nm or between 300 nm and 385 nm, to yield free radical(s).

In some embodiments, the liquid polymer comprises a photopolymer.

As used herein, the term "photopolymer" refers to a photo-polymerizable molecule being in form of a monomer, an oligomer, a polymer, or a mixture thereof. In one exemplary embodiment, the photo-polymerizable molecule comprises a photo-polymerizable unsaturated moiety (e.g. a vinyl group or an allyl group). In some embodiments, the photo-polymerizable molecule is photo-polymerizable or photo-curable at wavelengths ranging from about 200 nm to about 400 nm. Alternatively, the photo-polymerizable molecule is photo-polymerizable at visible wavelengths of the electromagnetic spectrum.

Non-limiting examples of photo-polymerizable molecules comprise: styrene, N-Vinylpyrrolidone, allyl acrylate, diacrylates (such as epoxides, urethanes, ethers, or esters functionalized by acrylate), tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, tridecyl methacrylate, tri(meth)acrylates (e.g., 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, and/or tris(2-hydroxy ethyl) isocyanurate triacrylate) or any combination thereof.

In some embodiments, the liquid polymer comprises a thermoset polymer. In some embodiments, the liquid polymer is curable by exposing the polymer to thermal radiation. In some embodiments, the liquid polymer comprises the same polymer as the wall. In some embodiments, the liquid polymer comprises a self-curable polymer.

Non-limiting examples of liquid polymers include but are not limited to polydimethylsioloxane (PDMS), polyacrylate, polyurethane, a photopolymer (e.g. Colorado photopolymer), a photo adhesive (e.g. NOA81), aliphatic polyester urethane acrylate oligomer, urethane (meth)acrylate resin, a (meth-)acrylate resin, a (meth-)acrylate amine oligomeric resin, a cycloaliphatic epoxy resin, a cyanate ester-based resin, a silicon polyurethane resin, and a dual cure resin (such as epoxy, silicon, etc.) or any combination thereof.

In some embodiments, the liquid and/or the liquid polymer is substantially polymerizable or curable by applying any of the curing methods as described herein. In some embodiments, the liquid polymer is substantially polymerizable under curing conditions as described herein.

As used herein the term "curing" refers to hardening a polymeric material by crosslinking of polymeric chain. Such crosslinking may result in the formation of a tridimensional polymeric network. Optionally, curing may refer to UV-induced crosslinking of the unsaturated moieties, such as carbon-carbon double bonds.

In some embodiments, curing comprises exposing the uncured liquid in contact with the support to electromagnetic radiation (such as UV-radiation, electron beam, X-ray) for a time sufficient for at least partial curing of the liquid polymer. In some embodiments, curing comprises a process selected from thermal curing and UV-curing. In some embodiments, curing comprises thermal curing and UV-curing. In some embodiments, thermal curing and UV-curing are performed simultaneously or subsequently.

In some embodiments, thermal curing comprises providing at least a part of the liquid to a temperature between 40 and 200° C. In some embodiments, thermal curing further comprises drying.

In some embodiments, curing is by exposing the liquid in contact with the support to electromagnetic radiation in a visible and/or infrared light spectrum. In some embodiments, curing is by exposing the liquid to electromagnetic radiation having a wavelength between 400 and 2000 nm, between 400 and 600 nm, between 600 and 800 nm, between 800 and 1000 nm, between 700 and 1000 nm, between 1000 and 1500 nm, between 1500 and 2000 nm, including any range or value therebetween.

In some embodiments, thermal curing is applied to the liquid comprising a thermally curable compound (e.g. a thermosetting polymer, as described hereinabove).

In some embodiments, UV-curing comprises exposing at least a part of the liquid, to UV or visible radiation under conditions suitable for curing at least a part of the liquid. In some embodiments, curing or UV-curing results in at least partially cured liquid.

In some embodiments, the method comprises providing the cured article and repeating the steps (i) and (ii) of the method and optionally any one of the steps (iii) and (iv). In some embodiments, the method comprises providing the cured article and repeating the steps (i) and (ii) of the method and optionally any one of the steps (iii) and (iv), thereby forming a coating on top of the cured article. In some embodiments, the method comprises providing the first cured article and repeating the steps (i), (ii) and (iv) of the method and optionally the step (iii), thereby forming a second cured article bound to the first cured article.

In some embodiments, the method further comprises applying a coating layer on top of at least one surface of the cured article. In some embodiments, applying is performed by any coating method known in the art (e.g. spin coating, spray coating, dip coating, etc.). In some embodiments, the coating layer is a reflective layer comprising a low melting point metal, as described hereinabove.

In some embodiments, the method further comprises releasing the cured article from the device and/or frame.

In some embodiments, conditions suitable for curing comprise an irradiation time ranging from 0.1 to 100 seconds(s). In some embodiments, conditions suitable for curing comprise thermal exposure to a temperature between 10 and 80° C. In some embodiments, conditions suitable for curing comprise thermal exposure to a temperature between 10 and 80° C. and an irradiation time ranging from 0.1 to 100 s. In some embodiments, conditions suitable for curing comprise thermal exposure to a temperature between 10 and 60° C., between 10 and 20° C., between 10 and 25° C., between 10 and 30° C., between 20 and 30° C., between 20 and 60° C., between 20 and 50° C., between 20 and 40° C., between 25 and 40° C., between 25 and 50° C., including any range or value therebetween.

In some embodiments, conditions suitable for curing comprise an irradiation time ranging from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, including any range or value therebetween.

In some embodiments, the irradiation time is sufficient for at least partial curing or solidification of the liquid. In some embodiments, the irradiation time is sufficient for at least 50%, at least 60%, at least 70%, at least 80%, at least 90%, at least 95%, at least 97%, curing or crosslinking of the liquid (e.g. the first liquid).

In some embodiments, curing comprises exposing the uncured liquid to an electromagnetic radiation dose in a range between 50 and 400 mJ/cm2, between 150 and 400 mJ/cm2, between 50 and 150 mJ/cm2, between 150 and 400 mJ/cm2, between 200 and 400 mJ/cm2, between 300 and 400 mJ/cm2, including any range or value therebetween.

In some embodiments, a radiation dose required for curing is at least 100 mJ/cm2, at least 150 mJ/cm2, at least 200 mJ/cm2, at least 300 mJ/cm2, at least 400 mJ/cm2 including any range or value therebetween.

In some embodiments, a cured article is devoid of adhesiveness. In some embodiments, a cured article is characterized by a hardness greater than a hardness of an uncured article. In some embodiments, a hardness a cured composition is greater than a hardness of an uncured article or of the uncured liquid by at least 20%, at least 40%, at least 60%, at least 80%, at least 100%, at least 200%, at least 300%, at least 500%, at least 1000%, at least 5000%, at least 100000%, including any range or value therebetween.

In some embodiments, a cured article is characterized by a cross-linking degree of the curable polymer ranging from 1 to 95%, from 1 to 10%, from 1 to 5%, from 5 to 15%, from 5 to 20%, from 5 to 25%, from 10 to 30%, from 30 to 50%, from 50 to 70%, from 70 to 80%, from 80 to 95%, including any range or value therebetween.

In some embodiments, curing results in at least 10%, at least 20%, at least 40%, at least 50%, at least 70%, at least 80%, at least 90% cross-linking of the curable polymer.

In some embodiments, the cured polymer or the cured article is characterized by root mean square of surface roughness (RMSh) being less than 10 nm, less than 8 nm, less than 5 nm, less than 3 nm, less than 2 nm, less than 1 nm including any range or value therebetween. In some embodiments, the cured polymer is further characterized by a standard deviation of RMSh of less than 0.6 nm, less than 0.4 nm, less than 0.3 nm, less than 0.2 nm, less than 0.1 nm including any range or value therebetween. In some embodiments, the cured polymer is further characterized by a substantially homogenous surface roughness. In some embodiments, the cured polymer is characterized by a constant curvature.

In some embodiments, the cured article can be any article. In some embodiments, the cured article is a mold. In some embodiments, the cured article is selected from an optical lens, and an optical mirror.

General

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

As used herein, the term "substantially" refers to at least 80%, at least 85%, at least 90%, at least 92%, at least 95%, at least 96%, at least 97%, at least 98%, at least 99%, including any range or value therebetween. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

EXAMPLES

Example 1

Space telescopes, as well as Earth-imaging satellites, rely on optical lenses or mirrors for their function. Imaging quality (e.g., resolution or light collection ability) directly depends on the size of the lens/mirror, which must also have a high surface quality. Launch constraints limit the size of a single-piece lens/mirror, while deployable telescopes are restricted to multi-segment mirror configurations, resulting in high engineering complexity and significant development time and cost.

The Fluidic Shaping approach, as described herein, offers a different approach for creating space telescopes—launching a volume of liquid that can be compacted into the launcher and shaping the liquid into a useful optical element in space. For example, a Falcon Heavy launch to L2 carrying 20 m$^3$ of liquid (7% of the fairing volume) will be able to create a 75 m diameter mirror—a full order of magnitude above NASA's James Webb space telescope (JWST), which is scheduled to launch in October 2021.

Figure 8:
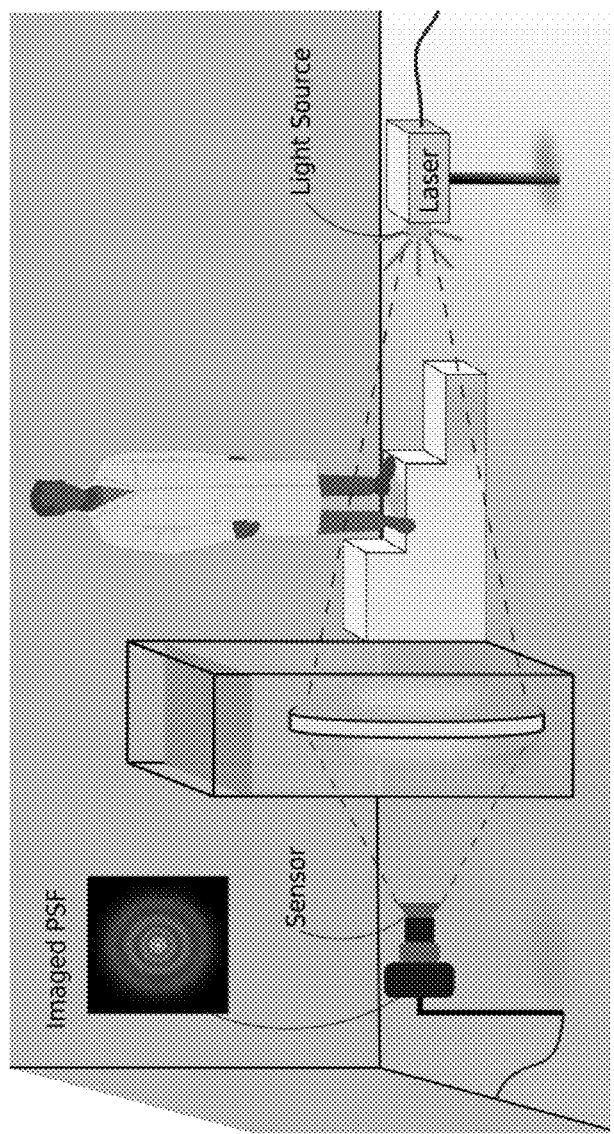
FIG. 8 presents a schematic illustration depicting an exemplary experimental setup for deployment of fluidic telescope lenses. For example, a tank filled with an immersion liquid may provide neutral buoyancy conditions in which the frame and liquid lens may be deployed. By applying light to the tested fluidic lens (e.g. from a light source, such as laser), the optical parameters of the resulting lens (e.g. point spread function, PSF) may be assessed via a sensor (e.g. wavefront sensor).

Optionally, an exemplary device of the invention may have the ability to (1) expand a bounding frame from a compact/folded state (2) fill it with the liquid (e.g. lens liquid), and (3) control the lens optical properties (e.g. lens power) by controlling the curvature of the liquid volume. The inventors plan testing this approach by forming a 1 m diameter lens on Earth. As illustrated in FIG. 8, the experiment may be conducted entirely on Earth in a large, 1.5× 1.5×0.3 m, neutral buoyancy tank that will be constructed by the inventors. Silicon oils of different viscosities within an aqueous immersion liquid can be utilized, together with measuring the quality of the resulting lens, its stability over time, sensitivity to temperature variation, and response time to changes in the lens liquid volume, based on common optical testing methods.

FIG. 7 illustrates several mechanisms for expandable frames that will be tested. A first optional non-limiting expansion mechanism is one that makes use of an inflatable tube (e.g. hollow-shaped tube), as illustrated in FIG. 7A. The tube may be made of a flexible hardened polymer (e.g., vulcanized rubber) and may be produced in the desired final shape, with an appropriate cross section. Initially, the tube is deflated completely and folded (e.g. in a spiral shape) to minimize its volume. The frame may be deployed by pumping compressed air into it through the inlet valve and inflating the tube, expanding it to predetermined size (e.g. full aperture size). For example, a 1 m diameter aperture (e.g. the predetermined size) can be folded to a spiral roughly 200 mm in diameter, while a 10 m aperture can be compacted to a 600 mm spiral.

Figure 7A:
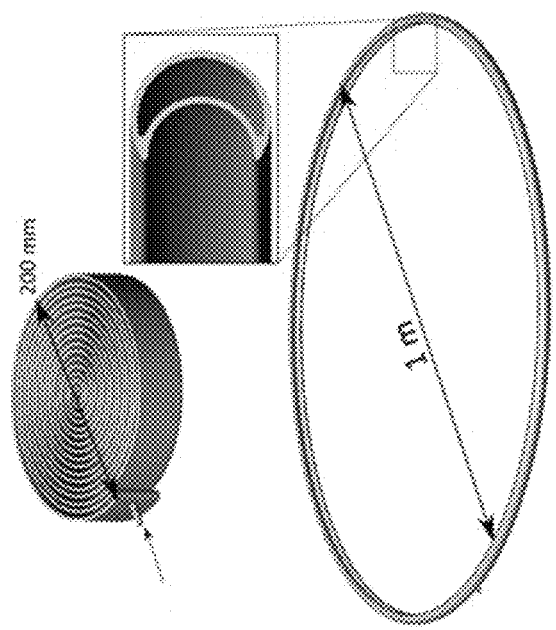
FIGS. 7A-7E present a schematic illustration depicting three non-limiting exemplary deployment mechanisms for a bounding frame.
Figure 7B:
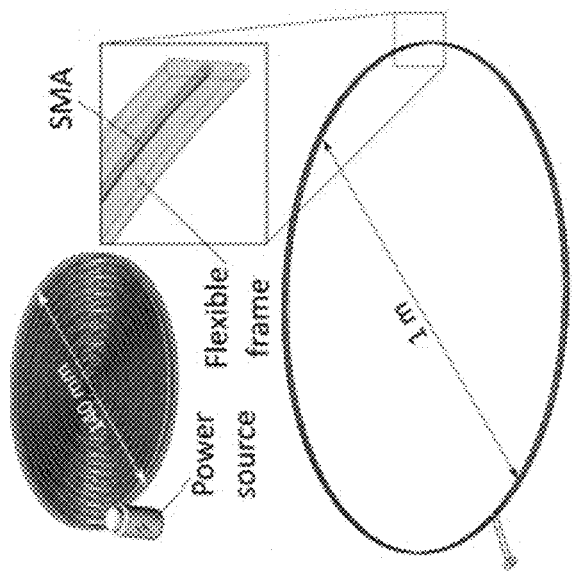
Figure 7D:
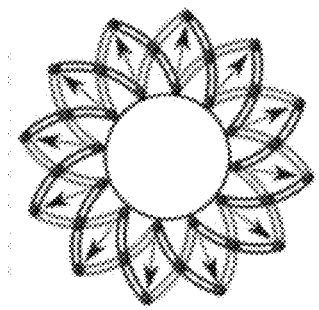
Figure 7E:
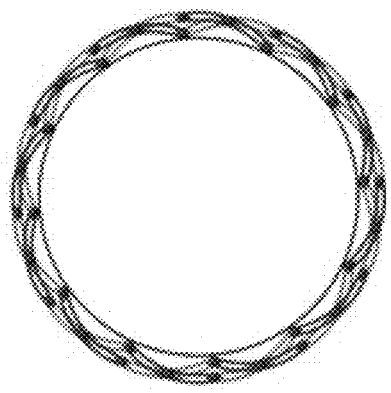
Figure 7C:
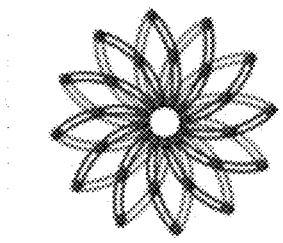

Furthermore, shape-memory alloy (SMA) can be optionally utilized as a deployment mechanism. As illustrated in FIG. 7B, SMA wires (e.g. Nitinol wires) can be embedded within a thin elastic sheet and thermally pre-set to their designated circular form and then folded into a small spiral. An SMA frame may allow a high packing factor, since it can be made of a single thin layer. To deploy the frame, the wires may be heated to their phase transformation temperature (typically about 50° C.), which can be achieved by utilizing a heating element, which can be powered by running an electrical current through the wires, inducing Joule heating. Various SMAs are known in the art and are used today in space.

Articulated structures can also serve as an expansion mechanism, and many already exist and have been tested in deployable space structures. An exemplary expansion mechanism is Hoberman linkage mechanism illustrated in FIG. 4, which consists of multiple chain linkages, connected to each other on their edges. When the two opposing vertices in each linkage move radially closer to each other (e.g., using a linear actuator), the inner frame expands while maintaining a circular shape, until the mechanism is fully spread. By attaching an elastic surface to the inner part of the mechanism it may be possible to create an expanding circular bounding frame.

Furthermore, the inventors will test a method of filling of the frame with liquid under operable conditions. The liquid must come in contact with the entire inner surface of the frame. One non-limiting strategy of filling of the frame with liquid may include synchronization of the filling together with frame expansion as illustrated in FIG. 4. Other options include using a 'wiper' to spread the liquid from its source, or using distributed fluidic ports (or a continuous port) around the frame, such as the frame illustrated in FIG. 1B, also referred to herein as the "C-Frame". An exemplary C-Frame may be a rigid frame whose cross-section profile is in the shape of the letter 'C', with the opening pointing inward (towards the lumen configured to be filled with the liquid volume), as depicted in FIG. 1B. The perimeter of such a 'C-Frame' thus serves as a fluidic channel through which the liquid can be injected radially into the frame from all directions.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for fabricating an article with a pre-defined shape comprising:
   a frame comprising a wall defining a radial dimension of said article;
   a reservoir comprising a liquid and being in fluid communication with a port in contact with or in close proximity to the wall;
   an actuator in operable communication with said reservoir and configured to induce flow of said liquid towards said port;
   a control unit configured to control said actuator to induce flow of the liquid so as to substantiality fill a lumen enclosed by said frame and to shape said article under microgravity conditions; wherein the microgravity conditions is a gravity of less than about ⅕ of the gravity on the Earth surface; wherein said article comprises a plurality of curved surfaces in contact with an ambient space; and wherein the device is devoid of a membrane in contact with the plurality of curved surfaces; wherein said control unit is configured to: (i) receive said pre-defined shape; (ii) calculate a volume of the liquid sufficient for shaping said article solely based on a surface tension of said liquid, a dimension of said wall, and acceleration force exerted on said device; and (iii) to control said actuator to induce flow of the liquid according to the received pre-defined shape.

2. The device of claim 1, wherein the pre-defined shape comprises a pre-defined curvature of the plurality of curved surfaces, and wherein the device is an optical device.

3. The device of claim 2, wherein the plurality of said curved surfaces define an optical surface of said optical device.

4. The device of claim 1, wherein said wall is an adjustable wall, optionally wherein said adjustable wall comprises a contracted configuration and an expanded configuration.

5. The device of claim 4, wherein said control unit is configured to: (i) receive a pre-defined curvature of said article; and (ii) further configured to control a dimension of said adjustable wall, and optionally an acceleration force exerted on said device according to the received pre-defined curvature.

6. The device of claim 4, wherein said adjustable wall comprises a substrate selected from the group consisting of an elastic polymeric substrate, an elastic fibrous substrate, and a shape memory substrate or any combination thereof.

7. The device of claim 1, wherein said liquid is characterized by surface tension and viscosity sufficient for formation of said article under space conditions comprising said microgravity, temperature, and pressure in the near earth space, optionally wherein said liquid comprises a curable liquid.

8. The device of claim 1, wherein said article is a fluidic lens; and wherein an optical property of said fluidic lens is variable by controlling any of (i) said volume of the liquid, (ii) said configuration of the wall, (iii) said acceleration force exerted on said fluidic optical device.

9. The device of claim 8, wherein said optical property comprises focal length, point spread function, and wave front scattering or any combination thereof.

10. The device of claim 1, wherein said device is disposed within a container; wherein the container is adapted for isolating said one or more devices from an ambient.

11. The device of claim 10, wherein the device comprises a plurality of said liquid lenses positioned along an optical axis.

12. A method of controlling the device of claim 1, comprising:
    determining, by the control unit, a volume of liquid sufficient for filling the lumen with said liquid;
    controlling the actuator by the control unit to induce flow of said volume of the liquid towards the port, so as to obtain the article.

13. The method of claim 12, wherein said device comprises the adjustable wall in a condensed configuration, and the method further comprises at least partially expanding the adjustable wall, and wherein said at least partially expanding and said inducing the flow are performed simultaneously or subsequently.

14. The method of claim 12, wherein the predetermined volume is sufficient for (i) filling the lumen with said liquid and (ii) for forming said article according to a predetermined curvature.

15. The method of claim 12, wherein said controlling comprises (i) receiving a pre-defined curvature, and (ii) calculating the predetermined volume of the liquid based on: a surface tension of said liquid, a dimension or shape of the wall and optionally on acceleration force exerted on said device.

16. The method of claim 12, wherein said method further comprises controlling a curvature of said article by modifying at least one of: a) a volume of said liquid, b) a dimension or a geometrical shape of the wall and c) acceleration force exerted on said device.

17. The method of claim 12, wherein said method further comprises hardening said liquid, thereby obtaining a cured article, optionally wherein hardening comprises curing.

* * * * *